United States Patent
Komiya et al.

(10) Patent No.: US 11,082,715 B2
(45) Date of Patent: Aug. 3, 2021

(54) VIDEO COMPRESSION APPARATUS, ELECTRONIC APPARATUS, AND VIDEO COMPRESSION PROGRAM

(71) Applicant: NIKON CORPORATION, Tokyo (JP)

(72) Inventors: Daisaku Komiya, Tokyo (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/651,884

(22) PCT Filed: Sep. 27, 2018

(86) PCT No.: PCT/JP2018/036130
§ 371 (c)(1),
(2) Date: Jun. 10, 2020

(87) PCT Pub. No.: WO2019/065916
PCT Pub. Date: Apr. 4, 2019

(65) Prior Publication Data
US 2020/0322627 A1   Oct. 8, 2020

(30) Foreign Application Priority Data
Sep. 29, 2017 (JP) .............................. JP2017-192105

(51) Int. Cl.
*H04N 19/57* (2014.01)
*H04N 19/105* (2014.01)
*H04N 19/139* (2014.01)
*H04N 5/232* (2006.01)

(52) U.S. Cl.
CPC ......... *H04N 19/57* (2014.11); *H04N 5/23216* (2013.01); *H04N 5/23218* (2018.08); *H04N 19/105* (2014.11); *H04N 19/139* (2014.11)

(58) Field of Classification Search
None
See application file for complete search history.

(56) References Cited

U.S. PATENT DOCUMENTS

| | | | |
|---|---|---|---|
| 2006/0023109 A1 | 2/2006 | Mabuchi et al. | |
| 2011/0019741 A1* | 1/2011 | Kameyama | H04N 19/61 375/240.13 |
| 2013/0300905 A1 | 11/2013 | Mabuchi et al. | |
| 2014/0104471 A1 | 4/2014 | Mabuchi et al. | |
| 2015/0077590 A1 | 3/2015 | Kuriyama et al. | |
| 2015/0155325 A1 | 6/2015 | Mabuchi et al. | |
| 2018/0122847 A1 | 5/2018 | Mabuchi et al. | |

FOREIGN PATENT DOCUMENTS

JP   2006-49361 A   2/2006

* cited by examiner

*Primary Examiner* — Christopher Braniff
(74) *Attorney, Agent, or Firm* — Oliff PLC

(57) ABSTRACT

A video compression apparatus for compressing video data as a series of frames outputted from an imaging element that has a plurality of imaging regions for imaging a subject and for which imaging conditions can be set for the respective imaging regions, includes: a setting unit configured to set, based on a plurality of imaging conditions, a search region within a reference frame used for a processing to detect, based on a compression target region, a specific region in the reference frame; and a generation unit configured to generate, based on the processing using the search region set by the setting unit, the specific region to thereby generate a motion vector.

16 Claims, 24 Drawing Sheets

VIDEO COMPRESSION APPARATUS, ELECTRONIC APPARATUS, AND VIDEO COMPRESSION PROGRAM

CLAIM OF PRIORITY

The present application claims priority from Japanese patent application JP 2017-192105 filed on Sep. 29, 2017, the content of which is hereby incorporated by reference into this application.

BACKGROUND

The present invention relates to a video compression apparatus, an electronic apparatus, and a video compression program.

An electronic device has been suggested in which a backside illumination-type imaging chip and a signal processing chip are layered (hereinafter referred to as a layered imaging element) (see Japanese Unexamined Patent Application Publication No. 2006-49361). The layered imaging element is configured so that the backside illumination-type imaging chip and the signal processing chip are layered so that the former and the latter are connected via a micro bump for each predetermined region. However, if the layered imaging element has a plurality of imaging conditions that can be set within an imaging region, a frame imaged under the plurality of imaging conditions is outputted. The video compression of such a frame has been conventionally not considered.

SUMMARY

A video compression apparatus according to one aspect of the technology disclosed in the present application is a video compression apparatus for compressing video data as a series of frames outputted from an imaging element that has a plurality of imaging regions for imaging a subject and for which imaging conditions can be set for the respective imaging regions, comprising: a setting unit configured to set, based on a plurality of imaging conditions, a search region within a reference frame used for a processing to detect, based on a compression target region, a specific region in the reference frame; and a generation unit configured to generate, based on the processing using the search region set by the setting unit, the specific region to thereby generate a motion vector.

A video compression apparatus according to another aspect of the technology disclosed in the present application is a video compression apparatus for compressing video data as a series of frames outputted from an imaging element that has a plurality of imaging regions for imaging a subject and for which imaging conditions can be set for the respective imaging regions, comprising: a setting unit configured to set a search region for detecting a specific region within a reference frame based on the plurality of imaging conditions; and a detection unit configured to detect, based on a compression target region having a frame different from the reference frame, the specific region from the search region set by the setting unit.

An electronic device according to one aspect of the technology disclosed in the present application is an electronic device, comprising: an imaging element that has a plurality of imaging regions for imaging a subject and that outputs video data for which imaging conditions can be set for the respective imaging regions and that are a series of frames; a setting unit configured to set, based on the plurality of imaging conditions, a search region within a reference frame used for a processing to detect, based on a compression target region, a specific region in the reference frame; and a generation unit configured to detect, based on the processing using the search region set by the setting unit, the specific region to thereby generate a motion vector.

A video compression program according to one aspect of the technology disclosed in the present application is a video compression program for causing a processor to execute the compression of video data as a series of frames outputted from an imaging element that has a plurality of imaging regions for imaging a subject and for which imaging conditions can be set for the respective imaging regions, wherein the video compression program causes the processor: to set, based on the plurality of imaging conditions, a search region within a reference frame used for a processing to detect, based on a compression target region, a specific region in the reference frame; and to detect, based on the processing using the search region, the specific region to thereby generate a motion vector.

DETAILED DESCRIPTION OF THE EMBODIMENT

<Configuration Example of Imaging Element>

First, the following section will describe a layered imaging element provided in an electronic device. It is noted that this layered imaging element is disclosed in Japanese Unexamined Patent Application Publication No. 2012-139026 previously applied by the applicant of this application. The electronic device is an imaging apparatus such as a digital camera or a digital video camera.

Figure 1:
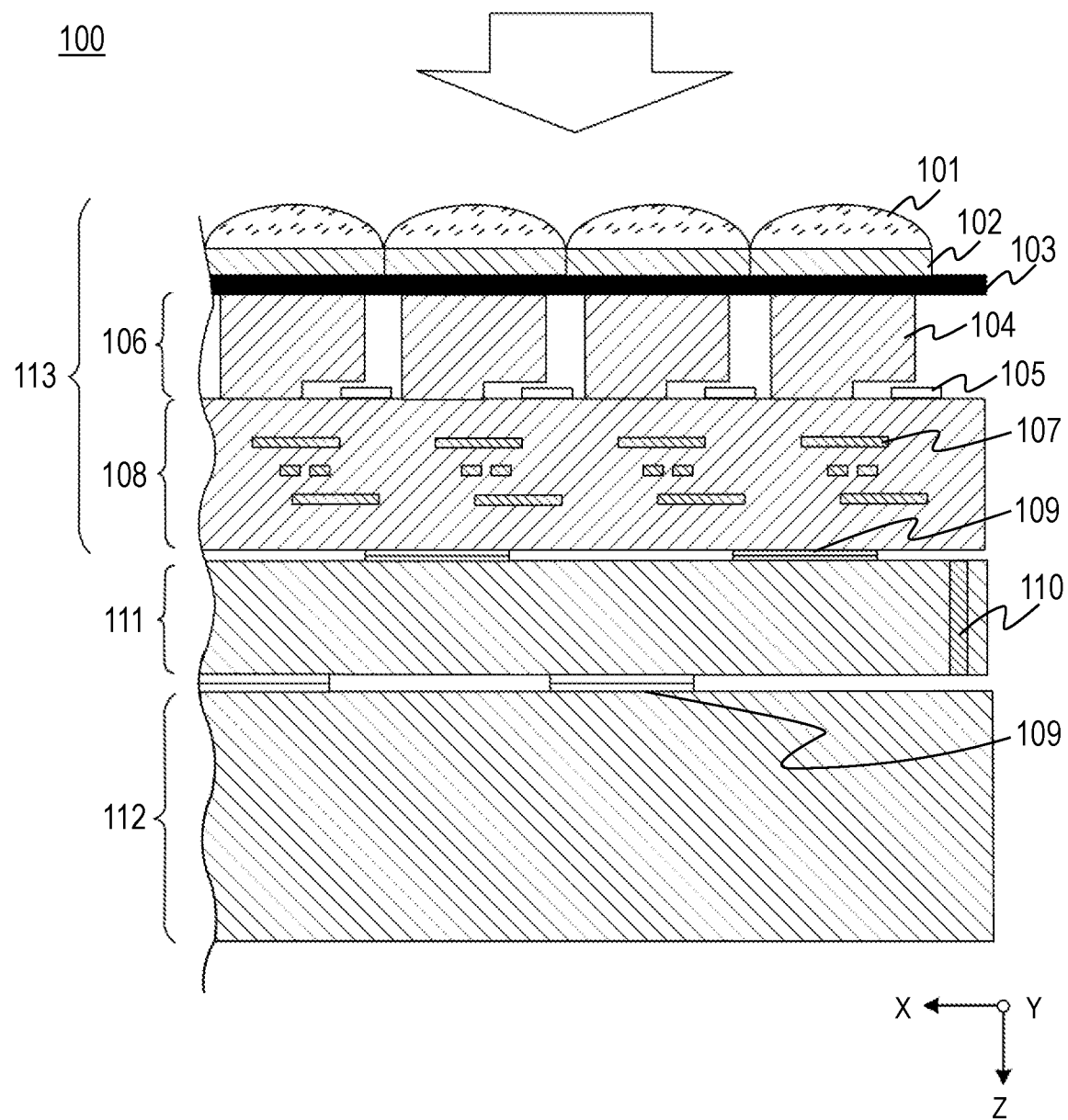
FIG. 1 is a cross-sectional view of a layered the imaging element.

FIG. 1 is a cross-sectional view of a layered the imaging element 100. The layered imaging element (hereinafter simply referred to as "imaging element") 100 includes a backside illumination-type imaging chip to output a pixel signal corresponding to incident light (hereinafter simply referred to as "imaging chip") 113, a signal processing chip 111 to process a pixel signal, and a memory chip 112 to store a pixel signal. The imaging chip 113, the signal processing chip 111, and the memory chip 112 are layered and are electrically connected by a bump 109 made of conductive material such as Cu.

As shown in FIG. 1, the incident light is inputted in a positive direction in the Z axis mainly shown by the outlined arrow. In this embodiment, the imaging chip 113 is configured so that a face to which the incident light is inputted is called a back face. As shown by the coordinate axes, a left direction orthogonal to Z axis when viewed on the paper is a positive X axis direction and a front direction orthogonal to the Z axis and the X axis when viewed on the paper is a positive Y axis direction. In some of the subsequent drawings, the coordinate axes are shown so as to show the directions of the drawings based on the coordinate axes of FIG. 1 as a reference.

One example of the imaging chip 113 is a backside illumination-type MOS (Metal Oxide Semiconductor) image sensor. A PD (photo diode) layer 106 is provided at the back face side of a wiring layer 108. The PD layer 106 is provided in a two-dimensional manner and has a plurality of PDs 104 in which the electric charge depending on the incident light is accumulated and transistors 105 provided to correspond to the PDs 104.

The side at which the PD layer 106 receives the incident light has color filters 102 via a passivation film 103. The color filters 102 have a plurality of types to allow light to be transmitted through wavelength regions different from one another. The color filters 102 have a specific arrangement corresponding to the respective PDs 104. The arrangement of the color filters 102 will be described later. A combination of the color filter 102, the PD 104, and the transistor 105 constitutes one pixel.

A side at which the color filter 102 receives the incident light has a microlens 101 corresponding to each pixel. The microlens 101 collects the incident light toward the corresponding PD 104.

The wiring layer 108 has a wiring 107 to transmit a pixel signal from the PD layer 106 to the signal processing chip 111. The wiring 107 may have a multi-layer structure or may include a passive element and an active element.

A surface of the wiring layer 108 has thereon a plurality of bumps 109. The plurality of bumps 109 are aligned with a plurality of bumps 109 provided on an opposing face of the signal processing chip 111. The pressurization of the imaging chip 113 and the signal processing chip 111 for example causes the aligned bumps 109 to be bonded to have an electrical connection therebetween.

Similarly, the signal processing chip 111 and the memory chip 112 have therebetween faces opposed to each other that have thereon a plurality of bumps 109. These bumps 109 are mutually aligned and the pressurization of the signal processing chip 111 and the memory chip 112 for example causes the aligned bumps 109 to be bonded to have an electrical connection therebetween.

The bonding between the bumps 109 is not limited to a Cu bump bonding by the solid phase diffusion and may use a micro bump coupling by the solder melting. One bump 109 may be provided relative to one block (which will be described later) for example. Thus, the bump 109 may have a size larger than the pitch of the PD 104. Surrounding regions other than a pixel region in which pixels are arranged may additionally have a bump larger than the bump 109 corresponding to the pixel region.

The signal processing chip 111 has a TSV (silicon through-electrode) 110 to provide the mutual connection among circuits provided on the top and back faces, respectively. The TSV 110 is preferably provided in the surrounding region. The TSV 110 also may be provided in the surrounding region of the imaging chip 113 and the memory chip 112.

Figure 2:
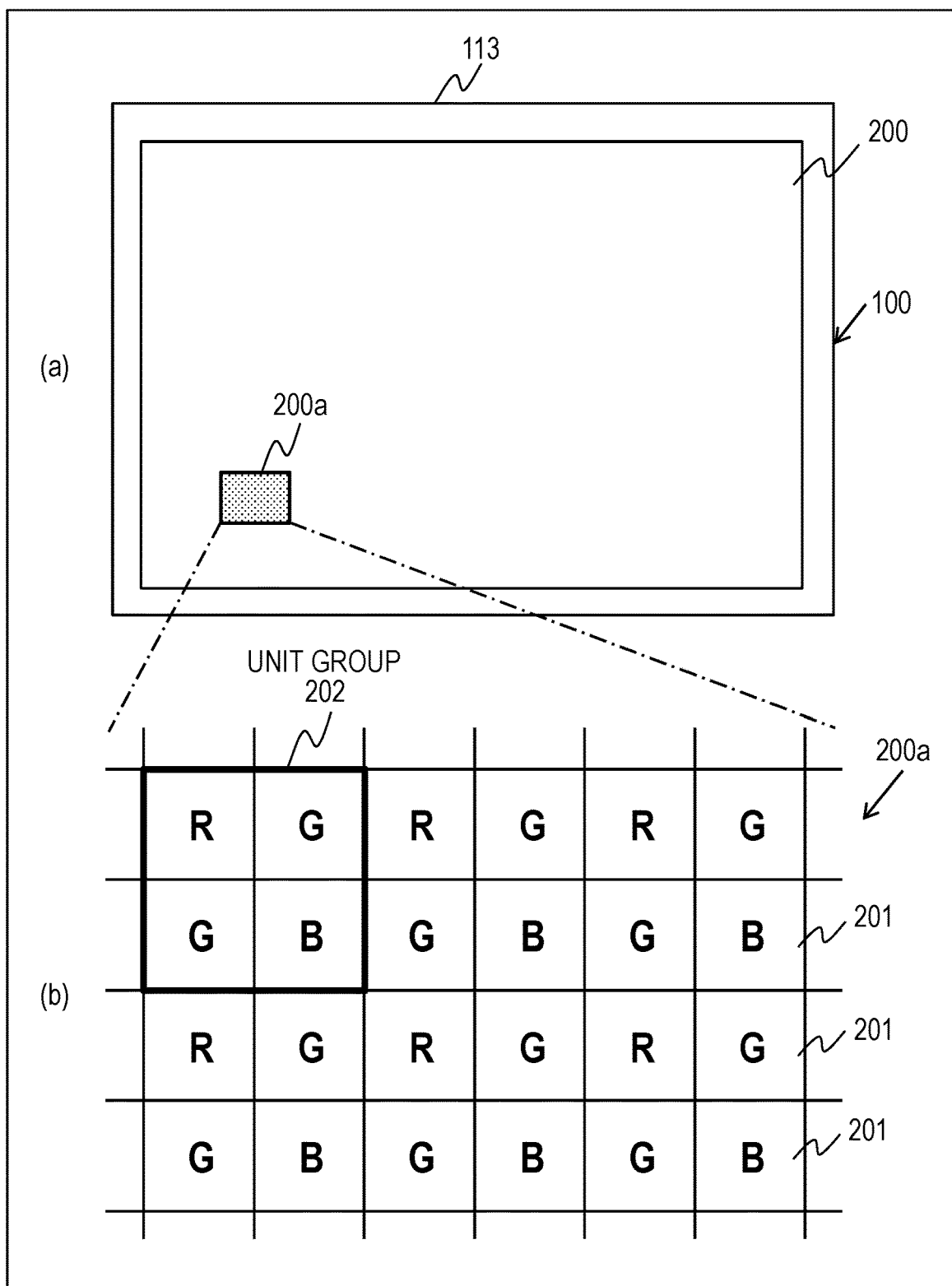
FIG. 2 illustrates the pixel arrangement of the imaging chip.

FIG. 2 illustrates the pixel arrangement of the imaging chip 113. In particular, (a) and (b) of FIG. 2 illustrate the imaging chip 113 observed from the back face side. In FIG. 2, (a) of FIG. 2 is a plan view schematically illustrating an imaging face 200 that is a back face of the imaging chip 113. In FIG. 2, (b) of FIG. 2 is an enlarged plan view illustrating a partial region 200a of the imaging face 200. As shown in (b) of FIG. 2, the imaging face 200 has many pixels 201 arranged in a two-dimensional manner.

The pixels 201 have color filter (not shown), respectively. The color filters consist of the three types of red (R), green(G), and blue (B). In (b) of FIG. 2, the reference numerals "R", "G", and "B" show the types of color filters owned by the pixels 201. As shown in (b) of FIG. 2, the imaging element 100 has the imaging face 200 on which the pixels 201 including the respective color filters as described above are arranged based on a so-called Bayer arrangement.

The pixel 201 having a red filter subjects red waveband light of the incident light to a photoelectric conversion to output a light reception signal (photoelectric conversion signal). Similarly, the pixel 201 having a green filter subjects green waveband light of the incident light to a photoelectric conversion to output a light reception signal. The pixel 201 having a blue filter subjects blue waveband light of the incident light to a photoelectric conversion to output a light reception signal.

The imaging element 100 is configured so that a unit group 202 consisting of the total of pixels 201 composed of 2 pixels×2 pixels adjacent to one another can be individually controlled. For example, when two unit groups 202 different from each other simultaneously start the electric charge accumulation, then one unit group 202 starts the electric charge reading (i.e., the light reception signal reading) after 1/30 seconds from the start of the electric charge accumulation and the another unit group 202 starts the electric charge reading after 1/15 seconds from the start of the electric charge accumulation. In other words, the imaging element 100 is configured so that one imaging operation can have a different exposure time (or an electric charge accumulation time or a so-called shutter speed) for each unit group 202.

The imaging element 100 also can set, in addition to the above-described exposure time, an imaging signal amplification factor (a so-called ISO sensibility) that is different for each unit group 202. The imaging element 100 can have, for each unit group 202, a different timing at which the electric charge accumulation is started and/or a different timing at which the light reception signal is read. Specifically, the imaging element 100 can have a different video imaging frame rate for each unit group 202.

In summary, the imaging element 100 is configured so that each unit group 202 has different imaging conditions such as the exposure time, the amplification factor, the frame rate, or the resolution. For example, a reading line (not shown) to read an imaging signal from a photoelectric conversion unit (not shown) owned by the pixel 201 is provided for each unit group 202 and an imaging signal can be read independently for each unit group 202, thereby allowing each unit group 202 to have a different exposure time (shutter speed).

An amplifier circuit (not shown) to amplify the imaging signal generated by the electric charge subjected to the photoelectric conversion is independently provided for each unit group 202. The amplification factor by the amplifier circuit can be controlled independently for each amplifier circuit, thereby allowing each unit group 202 to have a different signal amplification factor (ISO sensibility).

The imaging conditions that can be different for each unit group 202 may include, in addition to the above-described imaging conditions, the frame rate, a gain, a resolution (thinning rate), an addition line number or an addition row number to add pixel signals, the electric charge accumulation time or the accumulation number, and a digitization bit number for example. Furthermore, a control parameter may be a parameter in an image processing after an image signal is acquired from a pixel.

Regarding the imaging conditions, the brightness (diaphragm value) of each unit group 202 can be controlled by allowing the imaging element 100 to include a liquid crystal panel having a zone that can be independently controlled for each unit group 202 (one zone corresponds to one unit group 202) so that the liquid crystal panel is used as a light attenuation filter that can be turned ON or OFF for example.

The number of the pixels 201 constituting the unit group 202 is not limited to the above-described 4 (or 2×2) pixels. The unit group 202 may have at least one pixel 201 or may include more-than-four pixels 201.

Figure 3:
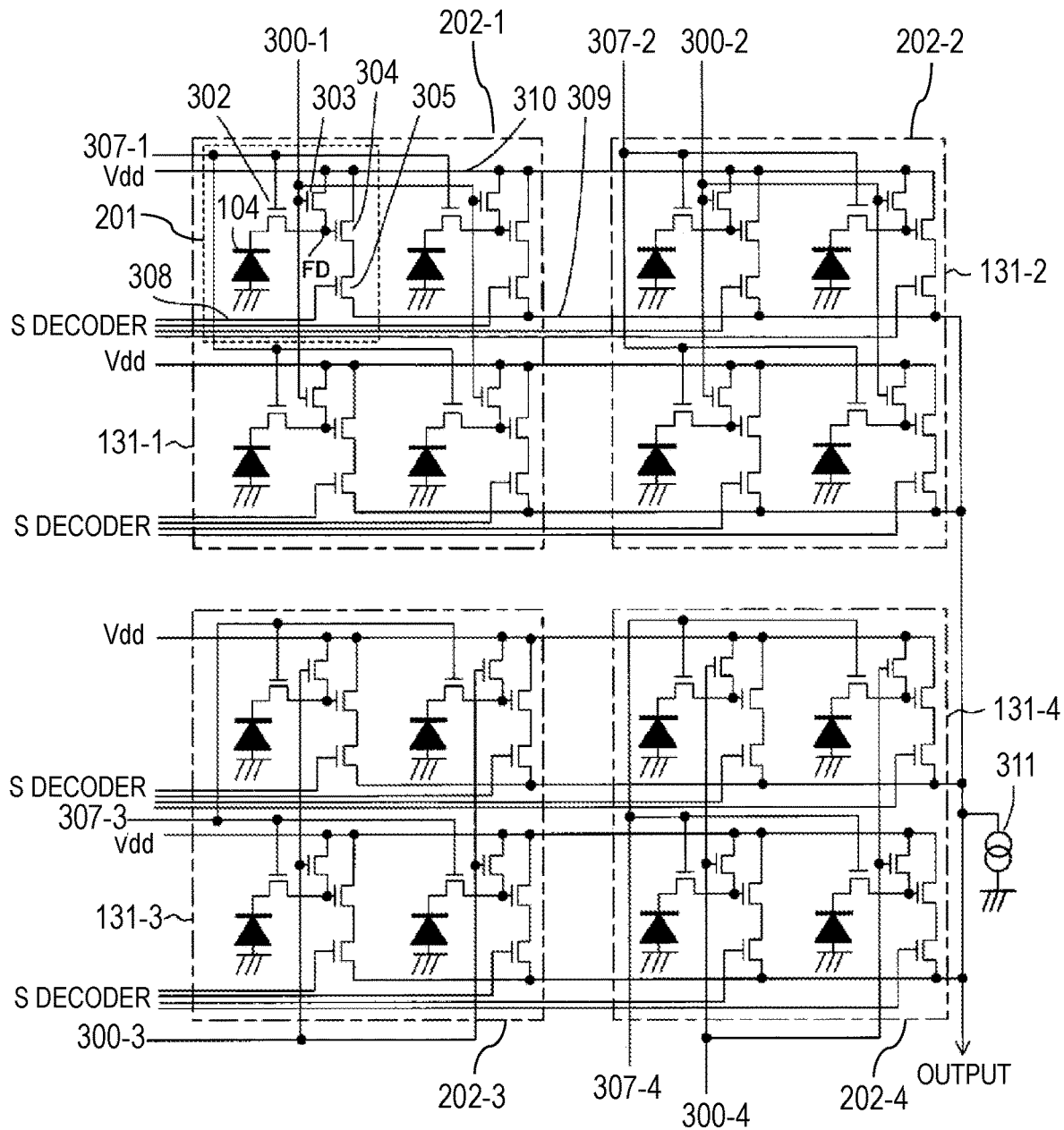
FIG. 3 is a circuit diagram illustrating the imaging chip.

FIG. 3 is a circuit diagram illustrating the imaging chip 113. In FIG. 3, a rectangle shown by the dotted line representatively shows a circuit corresponding to one pixel 201. A rectangle shown by a dashed line corresponds to one unit group 202 (202-1 to 202-4). At least a part of each transistor described below corresponds to the transistor 105 of FIG. 1.

As described above, the pixel 201 has a reset transistor 303 that is turned ON or OFF by the unit group 202 as a unit. A transfer transistor 302 of pixel 201 is also turned ON or OFF by the unit group 202 as a unit. In the example shown in FIG. 3, a reset wiring 300-1 is provided that is used to turn ON or OFF the four reset transistors 303 corresponding to the upper-left unit group 202-1. A TX wiring 307-1 is also provided that is used to supply a transfer pulse to the four transfer transistors 302 corresponding to the unit group 202-1.

Similarly, a reset wiring 300-3 is provided that is used to turn ON of OFF the four reset transistors 303 corresponding to the lower-left the unit group 202-3 so that the reset wiring 300-3 is provided separately from the reset wiring 300-1. A TX wiring 307-3 is provided that is used to supply a transfer pulse to the four transfer transistors 302 corresponding to the unit group 202-3 so that the TX wiring 307-3 is provided separately from the TX wiring 307-1.

An upper-right unit group 202-2 and a lower-right unit group 202-4 similarly have a reset wiring 300-2 and a TX wiring 307-2 as well as a reset wiring 300-4 and a TX wiring 307-4 that are provided in the respective unit groups 202.

The 16 PDs104 corresponding to each pixel 201 are connected to the corresponding transfer transistors 302, respectively. The gate of each transfer transistor 302 receives a transfer pulse supplied via the TX wiring of each unit group 202. The drain of each transfer transistor 302 is connected to the source of the corresponding reset transistor 303. A so-called floating diffusion FD between the drain of the transfer transistor 302 and the source of the reset transistor 303 is connected to the gate of the corresponding amplification transistor 304.

The drain of each reset transistor 303 is commonly connected to a Vdd wiring 310 to which a supply voltage is supplied. The gate of each reset transistor 303 receives a reset pulse supplied via the reset wiring of each unit group 202.

The drain of each amplification transistor 304 is commonly connected to the Vdd wiring 310 to which a supply voltage is supplied. The source of each amplification transistor 304 is connected to the drain of the corresponding the selection transistor 305. The gate of each the selection transistor 305 is connected to a decoder wiring 308 to which a selection pulse is supplied. The decoder wirings 308 are provided independently for 16 selection transistors 305, respectively.

The source of each selection transistor 305 is connected to a common output wiring 309. A load current source 311 supplies a current to an output wiring 309. Specifically, the output wiring 309 to the selection transistor 305 is formed by a source follower. It is noted that the load current source 311 may be provided at the imaging chip 113 side or may be provided at the signal processing chip 111 side.

The following section will describe the flow from the start of the accumulation of the electric charge to the pixel output after the completion of the accumulation. A reset pulse is applied to the reset transistor 303 through the reset wiring of each unit group 202 and a transfer pulse is simultaneously applied the transfer transistor 302 through the TX wiring of each unit group 202 (202-1 to 202-4). Then, the PD 104 and a potential of the floating diffusion FD are reset for each unit group 202.

When the application of the transfer pulse is cancelled, each PD 104 converts the received incident light to electric charge to accumulate the electric charge. Thereafter, when a transfer pulse is applied again while no reset pulse is being applied, the accumulated electric charge is transferred to the floating diffusion FD. The potential of the floating diffusion FD is used as a signal potential after the accumulation of the electric charge from the reset potential.

Then, when a selection pulse is applied to the selection transistor 305 through the decoder wiring 308, a variation of the signal potential of the floating diffusion FD is transmitted to the output wiring 309 via the amplification transistor 304 and the selection transistor 305. This allows the pixel signal corresponding to the reset potential and the signal potential to be outputted from the unit pixel to the output wiring 309.

As described above, the four pixels forming the unit group 202 have common reset wiring and TX wiring. Specifically, the reset pulse and the transfer pulse are simultaneously applied to the four pixels within the unit group 202, respectively. Thus, all pixels 201 forming a certain unit group 202 start the electric charge accumulation at the same timing and complete the electric charge accumulation at the same timing. However, a pixel signal corresponding to the accumulated electric charge is selectively outputted from the output wiring 309 by sequentially applying the selection pulse to the respective selection transistors 305.

In this manner, the timing at which the electric charge accumulation is started can be controlled for each unit group 202. In other words, images can be formed at different timings among different unit groups 202.

Figure 4:
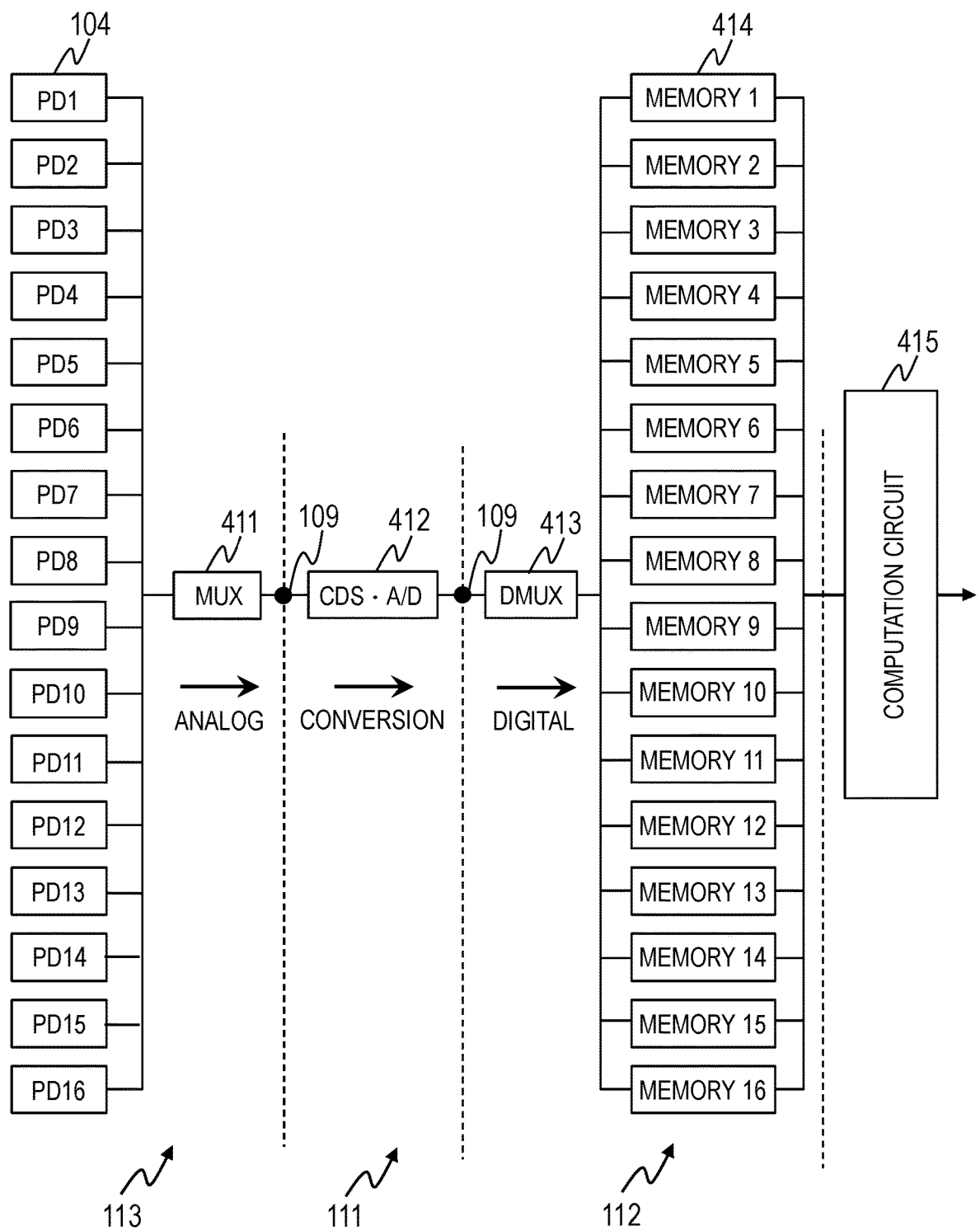
FIG. 4 is a block diagram illustrating an example of the functional configuration of the imaging element.

FIG. 4 is a block diagram illustrating an example of the functional configuration of the imaging element 100. An analog multiplexer 411 sequentially selects the sixteen PDs 104 forming the unit group 202 to output the respective pixel signals to the output wiring 309 provided to correspond to the unit group 202. The multiplexer 411 is formed in the imaging chip 113 together with the PDs 104.

The pixel signal outputted via the multiplexer 411 is subjected to the correlated double sampling (CDS) and the analog/digital (A/D) conversion performed by the signal processing circuit 412 formed in the signal processing chip 111. The A/D-converted pixel signal is sent to a demultiplexer 413 and is stored in a pixel memory 414 corresponding to the respective pixels. The demultiplexer 413 and the pixel memory 414 are formed in the memory chip 112.

A computation circuit 415 processes the pixel signal stored in the pixel memory 414 to send the result to the subsequent image processing unit. The computation circuit 415 may be provided in the signal processing chip 111 or may be provided in the memory chip 112. It is noted that FIG. 4 shows the connection of the four unit groups 202 but they actually exist for each of the four unit groups 202 and operate in a parallel manner.

However, the computation circuit 415 does not have to exist for each of the four unit groups 202. For example, one computation circuit 415 may provide a sequential processing while sequentially referring to the values of the pixel memories 414 corresponding to the respective four unit groups 202.

As described above, the output wirings 309 are provided to correspond to the respective unit groups 202. The imaging element 100 is configured by layering the imaging chip 113, the signal processing chip 111, and the memory chip 112. Thus, these output wirings 309 can use the electrical connection among chips using the bump 109 to thereby providing a wiring arrangement without causing an increase of the respective chips in the face direction.

<Block Configuration Example of Electronic Device>

Figure 5:
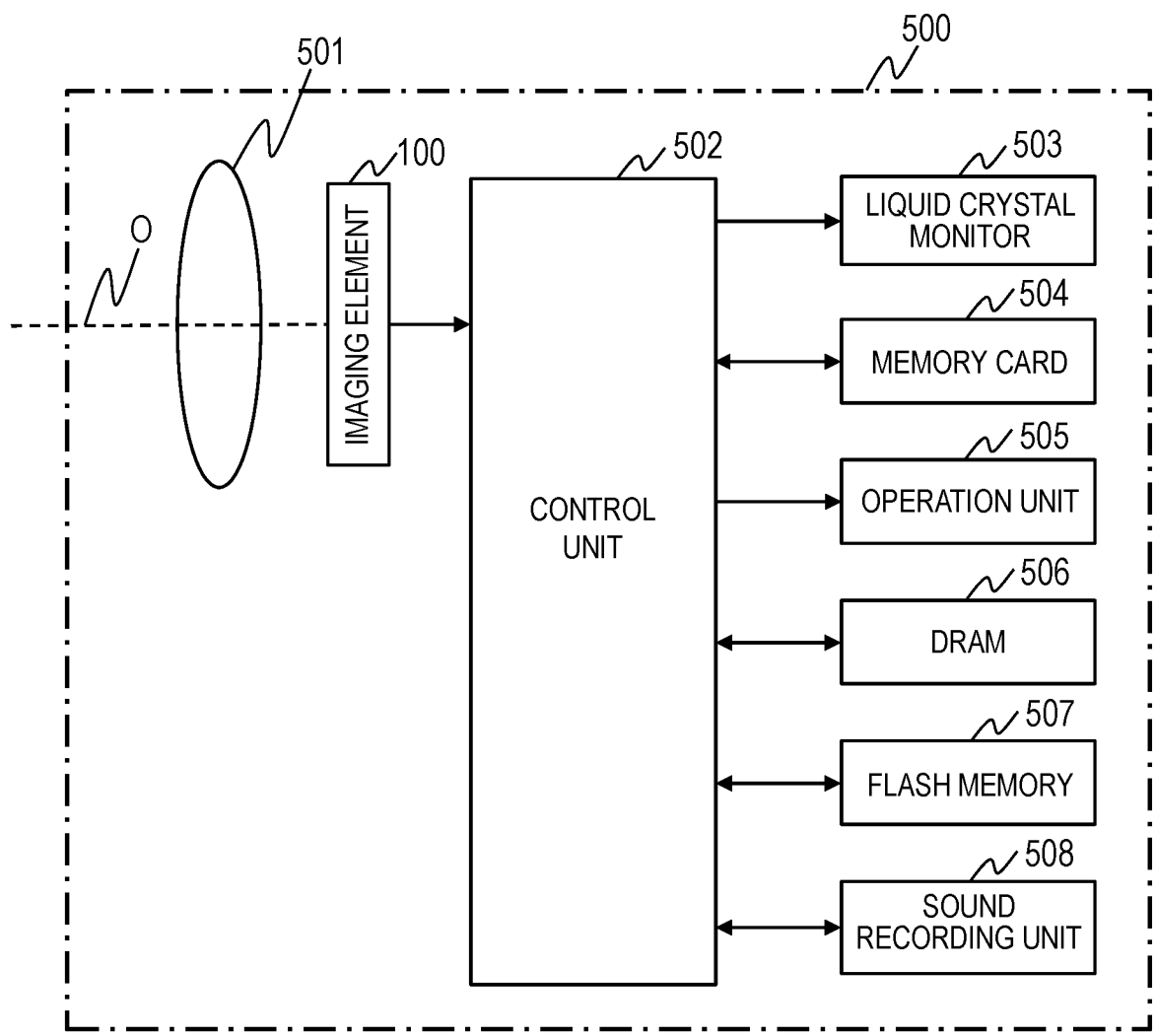
FIG. 5 illustrates the block configuration example of an electronic device.

FIG. 5 illustrates the block configuration example of an electronic device. An electronic device 500 is a lens integrated-type camera for example. The electronic device 500 includes an imaging optical system 501, an imaging element 100, a control unit 502, a liquid crystal monitor 503, a memory card 504, an operation unit 505, a DRAM 506, a flash memory 507, and a sound recording unit 508. The control unit 502 includes a compression unit for compressing video data as described later. Thus, a configuration in the electronic device 500 that includes at least the control unit 502 functions as a video compression apparatus.

The imaging optical system 501 is composed of a plurality of lenses and allows the imaging face 200 of the imaging element 100 to form a subject image. It is noted that FIG. 5 shows the imaging optical system 501 as one lens for convenience.

The imaging element 100 is an imaging element such as a CMOS (Complementary Metal Oxide Semiconductor) or a CCD (Charge Coupled Device) and images a subject image formed by the imaging optical system 501 to output an imaging signal. The control unit 502 is an electronic circuit to control the respective units of the electronic device 500 and is composed of a processor and a surrounding circuit thereof.

The flash memory 507, which is a nonvolatile storage medium, includes a predetermined control program written therein in advance. The control unit 502 reads the control program from the flash memory 507 to execute the control program to thereby control the respective units. This control program uses, as a work area, the DRAM 506 functioning as a volatile storage medium.

The liquid crystal monitor 503 is a display apparatus using a liquid crystal panel. The control unit 502 allows, at a predetermined cycle (e.g., $^{60}/_1$ seconds), the imaging element 100 to form a subject image repeatedly. Then, the imaging signal outputted from the imaging element 100 is subjected to various image processings to prepare a so-called through image to display the through image on the liquid crystal monitor 503. The liquid crystal monitor 503 displays, in addition to the above through image, a screen used to set imaging conditions for example.

The control unit 502 prepares, based on the imaging signal outputted from the imaging element 100, an image file (which will be described later) to record the image file on the memory card 504 functioning as a portable recording medium. The operation unit 505 has various operation units such as a push button. The operation unit 505 outputs, depending on the operation of these operation members, an operation signal to the control unit 502.

The sound recording unit 508 is composed of a microphone for example and converts the environmental sound to an acoustic signal to input the resultant signal to the control unit 502. It is noted that the control unit 502 may record a video file not in the memory card 504 functioning as a portable recording medium but in a recording medium (not shown) included in the electronic device 500 such as a hard disk.

<Configuration Example of Video File>

Figure 6:
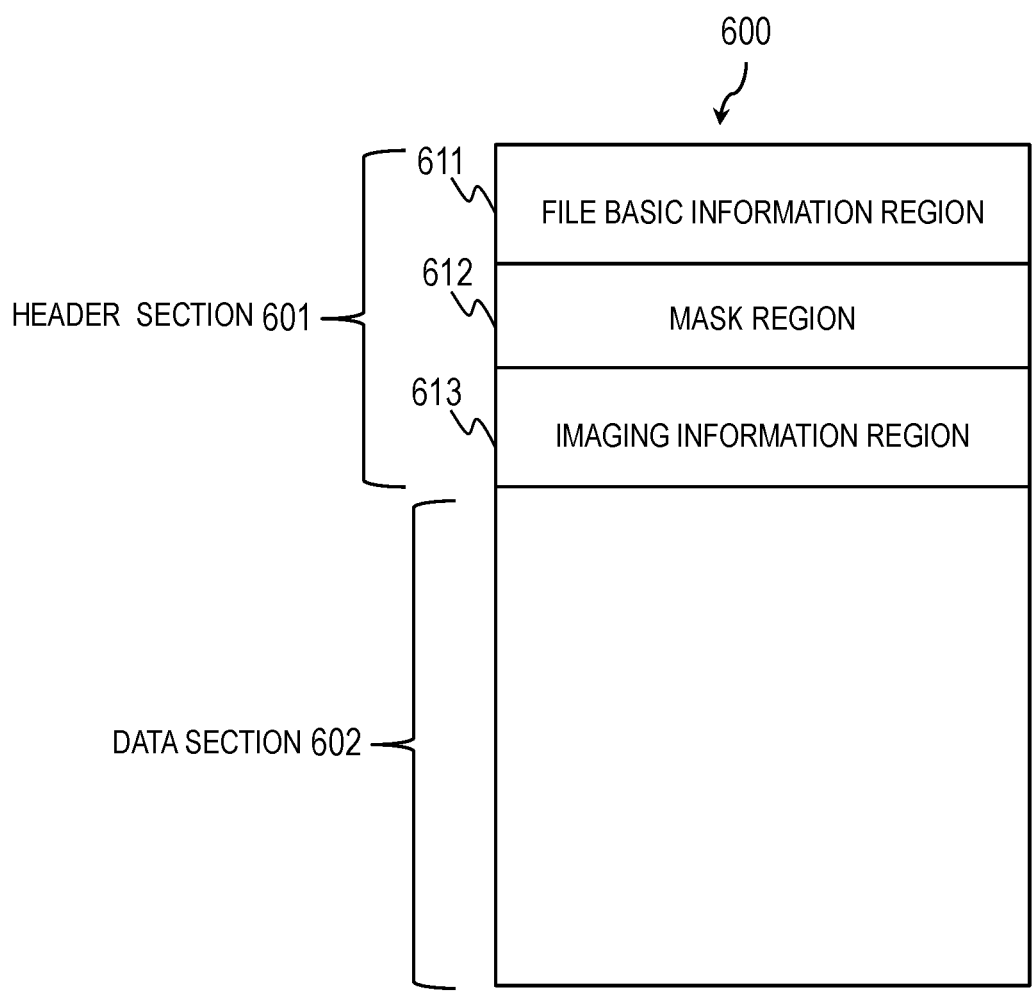
FIG. 6 illustrates a configuration example of a video file.

FIG. 6 illustrates a configuration example of a video file. A video file 600 is generated during the compression processing by a compression unit 902 (which will be described later) within the control unit 502 and is stored in the memory card 504, the DRAM 506, or the flash memory 507. The video file 600 is composed of two blocks of a header section 601 and a data section 602. The header section 601 is a block positioned at the top of the video file 600. The header section 601 includes therein a file basic information region 611, a mask region 612, and an imaging information region 613 stored in the above-described order.

The file basic information region 611 includes, for example, the records for the size or offset of the respective units within the video file 600 (e.g., the header section 601, the data section 602, the mask region 612, the imaging information region 613). The mask region 612 includes the records for imaging condition information and/or mask information (which will be described later) for example. The imaging information region 613 includes the record for imaging-related information such as the model name of the electronic device 500 or information for the imaging optical system 501 (e.g., information related to an optical characteristic such as aberration). The data section 602 is a block positioned at the rear side of the header section 601 and includes the record for the image information or acoustic information for example.

<Relation Between the Imaging Face and the Subject Image>

Figure 7:
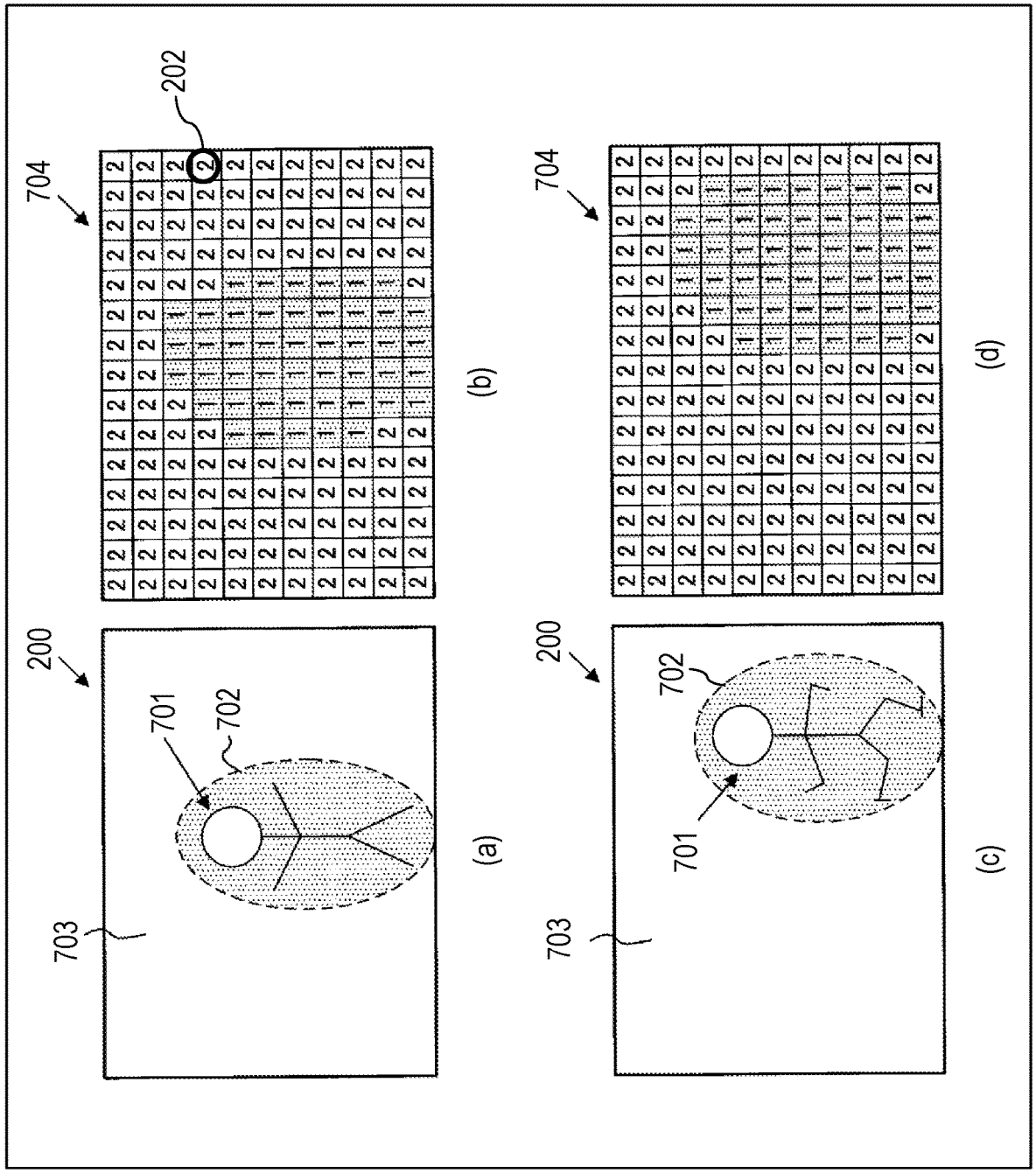
FIG. 7 illustrates the relation between an imaging face and a subject image.

FIG. 7 illustrates the relation between an imaging face and a subject image. In FIG. 7, (a) of FIG. 7 is a schematic view illustrating the imaging face 200 (imaging range) of the imaging element 100 and a subject image 701. In (a) of FIG. 7, the control unit 502 images the subject image 701. The imaging operation of (a) of FIG. 7 also may be used as an imaging operation performed to prepare a live view image (a so-called through image).

The control unit 502 subjects the subject image 701 obtained by the imaging operation of (a) of FIG. 7 to a predetermined image analysis processing. The image analysis processing is a processing to use a well-known subject detection technique (a technique to compute a feature quantity to detect a range in which a predetermined subject exists) for example to detect a main subject region and a background region. The image analysis processing causes the imaging face 200 to be divided to a main subject region 702 including a main subject and a background region 703 including the background.

It is noted that (a) of FIG. 7 shows that a region approximately including the subject image 701 is shown as the main subject region 702. However, the main subject region 702 may have a shape formed along the external form of the subject image 701. Specifically, the main subject region 702 may be set so as not to include images other than the subject image 701.

The control unit 502 sets different imaging conditions for each unit group 202 in the main subject region 702 and each unit group 202 in the background region 703. For example, a precedent unit group 202 is set to have a higher shutter speed than that of a subsequent unit group 202. This suppresses, in the imaging operation of (c) of FIG. 7 after the imaging operation of (a) of FIG. 7, the main subject region 702 from having image blur.

The control unit 502 is configured, when the influence by a light source such as sun existing in the background region 703 causes the main subject region 702 to have a backlight status, to set the unit group 202 of the former to have a relatively-high ISO sensibility or a lower shutter speed. The control unit 502 is also configured to set the unit group 202 of the latter to have a relatively-low ISO sensibility or a higher shutter speed. This can prevent, in the imaging operation of FIG. 7(c), the black defect of the main subject region 702 in the backlight status and the blown out highlights of the background region 703 having a high light quantity.

It is noted that the image analysis processing may be a processing different from the above-described processing to detect the main subject region 702 and the background region 703. For example, this processing may be a processing to detect a part of the entire imaging face 200 that has a brightness equal to or higher than a certain value (a part having an excessively-high brightness) or that has a brightness lower than the than a certain value (a part having an excessively-low brightness). When the image analysis processing is such a processing, the control unit 502 sets the shutter speed and/or the ISO sensibility so that the unit group 202 included in the former region has an exposure value (Ev value) lower than that of the unit group 202 included in another region.

The control unit 502 sets the shutter speed and/or the ISO sensibility so that the unit group 202 included in the latter region has an exposure value (Ev value) higher than that of the unit group 202 included in another region. This can consequently allow an image obtained through the imaging operation of (c) of FIG. 7 to have a dynamic range wider than the original dynamic range of the imaging element 100.

In FIG. 7, (b) of FIG. 7 shows one example of mask information 704 corresponding to the imaging face 200 shown in (a) of FIG. 7. The position of the unit group 202 belonging to the main subject region 702 stores therein "1" and the position of the unit group 202 belonging to the background region 703 stores therein "2", respectively.

The control unit 502 subjects the image data of the first frame to the image analysis processing to detect the main subject region 702 and the background region 703. This allows, as shown in FIG. (c), the frame obtained by the imaging operation of (a) of FIG. 7 to be divided to the main subject region 702 and the background region 703. The control unit 502 sets different imaging conditions for each unit group 202 in the main subject region 702 and each unit group 202 in the background region 703 to perform the imaging operation of (c) of FIG. 7 to prepare image data. An example of the resultant mask information 704 is shown in (d) of FIG. 7.

The mask information 704 of (b) of FIG. 7 corresponding to the imaging result of FIG. 7(a) and the mask information 704 of (d) of FIG. 7 corresponding to the imaging result of (c) of FIG. 7 are obtained by the imaging operations performed at different times (or have a time difference). Thus, these two pieces of the mask information 704 have different contents when the subject has moved or the user has moved the electronic device 500. In other words, the mask information 704 is dynamic information changing with the time passage. Thus, a certain unit group 202 has different imaging conditions set for the respective frames.

<Specific Example of the Video File>

Figure 8:
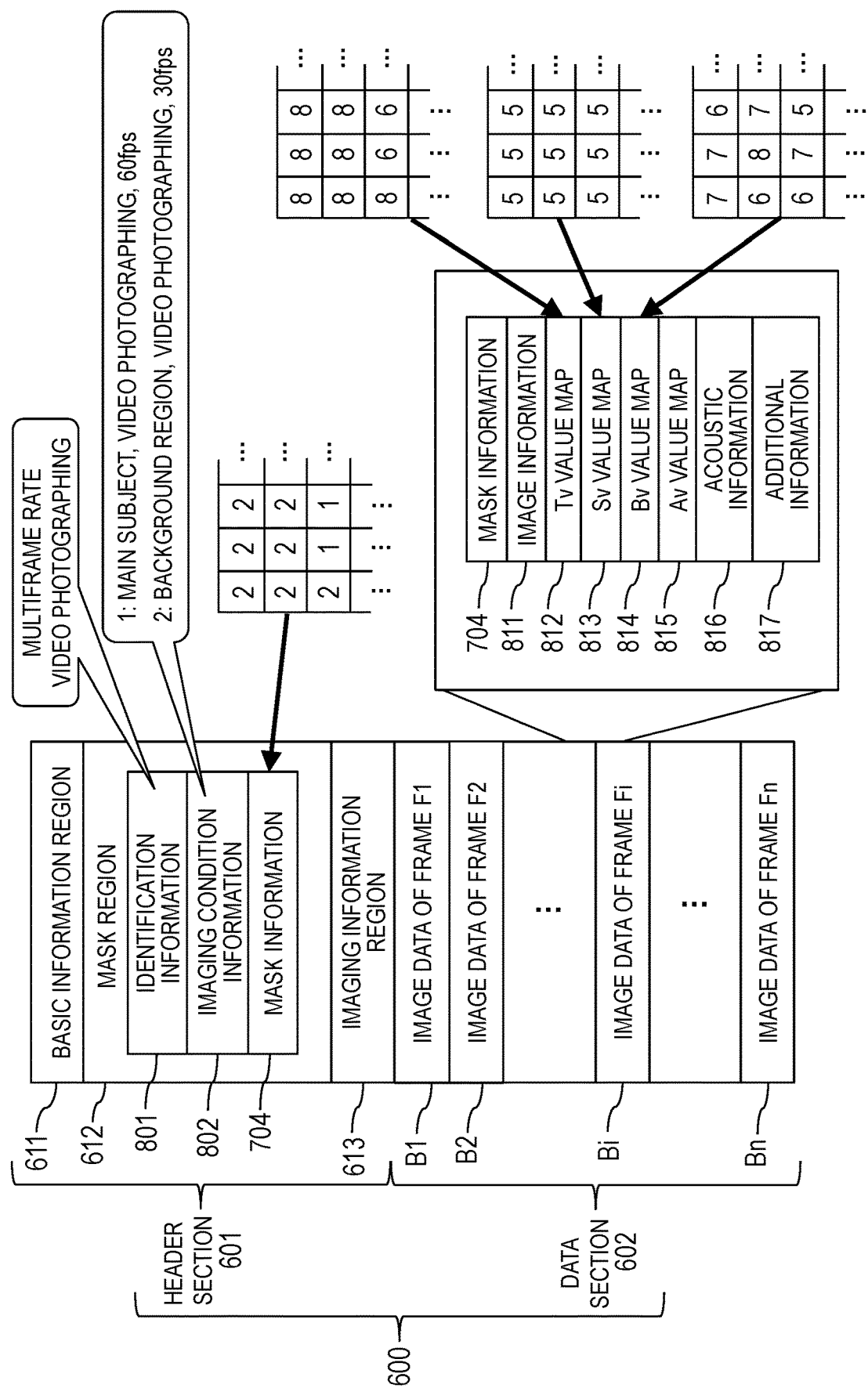
FIG. 8 illustrates a specific configuration example of the video file 600.

FIG. 8 illustrates a specific configuration example of the video file 600. The mask region 612 includes identification information 801, imaging condition information 802, and the mask information 704 recorded in above-described order.

The identification information 801 shows that this video file 600 is prepared by a multi imaging condition video imaging function. The multi imaging condition video imaging function is a function to use the imaging element 100 for which a plurality of imaging conditions is set to perform a video photographing operation.

The imaging condition information 802 is information showing what application (objective, role) is owned by the unit group 202. For example, as described above, when the imaging face 200 ((a) of FIG. 7) is divided to the main subject region 702 and the background region 703, the respective unit groups 202 belong to the main subject region 702 or the background region 703.

Specifically, the imaging condition information 802 is information that shows, in order to prepare this video file 600, that the unit group 202 has two applications of "the main subject region is subjected to a video imaging operation at 60 fps" and "the background region is subjected to the video imaging operation at 30 fps" for example and that shows the unique numbers applied to these applications. For example, the number "1" is applied to the application that "the main subject region is subjected to a video imaging operation at 60 fps" and the number 2 is applied to the application that "the background region is subjected to the video imaging operation at 30 fps", respectively.

The mask information 704 is information showing the applications (objectives, roles) of the respective unit groups 202. The mask information 704 is "information obtained by representing the number applied to the imaging condition information 802 as a two-dimensional map corresponding to the position of the unit group 202". Specifically, when the unit group 202 arranged in a two-dimensional manner is identified by the two-dimensional coordinate (x, y) based on two integers (x, y), the application of the unit group 202 existing at the position (x, y) is represented by the number existing at the position (x, y) of the mask information 704.

For example, when the number "1" exists at the coordinate (3,5) of the mask information 704, it can be understood that the unit group 202 positioned at the coordinate (3,5) has the application that "the main subject region is subjected to a video imaging operation at 60 fps". In other words, it can be understood that the unit group 202 positioned at the coordinate (3,5) belongs to the main subject region 702.

It is noted that the mask information 704 is dynamic information changing for each frame. Thus, the mask information 704 is recorded for each frame (i.e., for each data block Bi (which will be described later)) during the compression processing (not shown).

The data section 602 stores therein data blocks B1 to Bn as video data for each frame F (F1 to Fn) in an order of the imaging operations. The data block Bi (I is an integer for which 1≤i≤n is established) includes the mask information 704, image information 811, a Tv value map 812, an Sv value map 813, a Bv value map 814, an Av value information 815, acoustic information 816, and additional information 817.

The image information 811 is information obtained by using the imaging operation of (c) of FIG. 7 to record the imaging signal outputted from the imaging element 100 in a form prior to various image processings. The image information 811 is so-called RAW image data.

The Tv value map 812 is information obtained by representing the Tv value representing the shutter speed set for each unit group 202 so that the Tv value corresponds to the position of the unit group 202. For example, the shutter speed set for the unit group 202 positioned at the coordinate (x, y) can be distinguished by investigating the Tv value stored in the coordinate (x, y) of the Tv value map 812.

The Sv value map 813 is information obtained by representing the Sv value representing the ISO sensibility set for each unit group 202 as a two-dimensional map as in the Tv value map 812.

The Bv value map 814 is information obtained by representing the subject luminance measured for each unit group 202 during the imaging operation of (c) of FIG. 7 (i.e., the Bv value representing the luminance of the subject light entered each unit group 202) in the form of a two-dimensional map as in the Tv value map 812.

The Av value information 815 is information representing the diaphragm value during the imaging operation of (c) of FIG. 7. The Av value is not a value existing for each unit group 202, unlike the Tv value, the Sv value, and the Bv value. Thus, unlike the Tv value, the Sv value, and the Bv value, only one Av value is stored and the Av value is not information obtained by mapping a plurality of values in a two-dimensional manner.

In order to provide a smooth video reproduction, the acoustic information 816 is divided for each information piece corresponding to one frame and is multiplexed with the data block Bi and the resultant data is stored in the data section 602. It is noted that the acoustic information 816 may be multiplexed not for one frame but for a predetermined number of frames. It is noted that the acoustic information 816 is not always required to be included.

The additional information 817 is information obtained by representing, during the imaging operation of (c) of FIG. 7, the frame rate set for each unit group 202 in the form of a two-dimensional map. How to set the additional information 817 will be described later with reference to FIG. 14 and FIG. 15. It is noted that the additional information 817 may be retained in the frame F but also may be retained in the cache memory of the processor 1201 (which will be described later). When the compression processing is executed real-time in particular, the use of the cache memory is preferred from the viewpoint of a high processing.

As described above, the control unit 502 is configured to record in the memory card 504, by performing the imaging operation based on the video imaging function, the video file 600 in which the image information 811 generated by the imaging element 100 for which imaging conditions can be set for each unit group 202 and data regarding the imaging conditions for each unit group 202 (e.g., the imaging condition information 802, the mask information 704, the Tv value map 812, the Sv value map 813, the By value map 814) are associated.

The following section will describe an illustrative embodiment of the above-described video compression using the imaging element 100.

<Block Matching Example>

Next, the following section will describe the block matching in the case where a plurality of imaging conditions is set for one frame. In this illustrative embodiment, when there is a difference in the imaging condition in the search range used for the block matching, this difference is used to optimize the block matching, thereby providing the reduction of the processing load of the block matching and the suppression of the decline of accuracy of the block matching.

Figure 9:
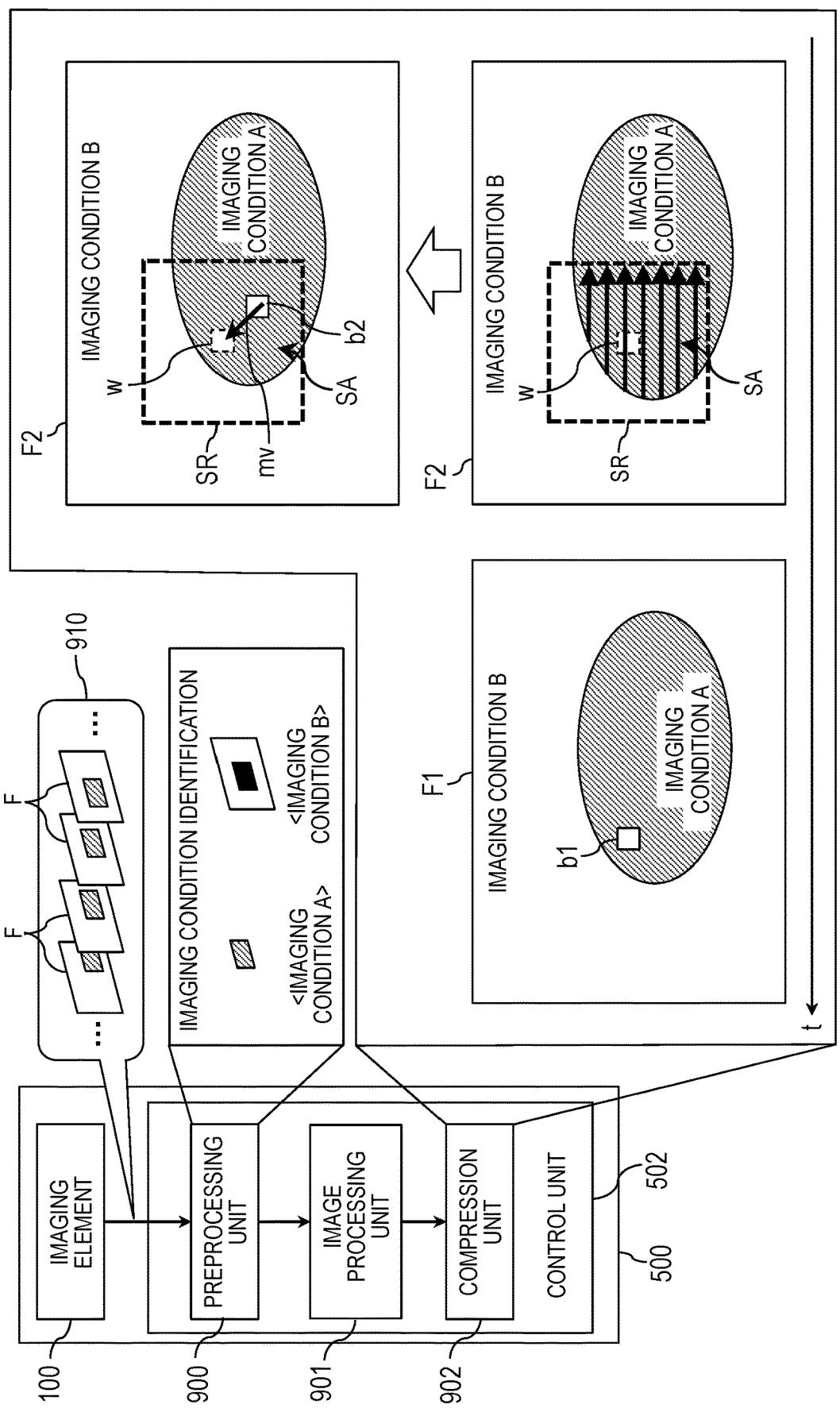
FIG. 9 illustrates a block matching example.

FIG. 9 illustrates a block matching example. The electronic device 500 has the above-described imaging element 100 and the control unit 502. The control unit 502 includes a preprocessing unit 900, an image processing unit 901, and a compression unit 902. As described above, the imaging element 100 has a plurality of imaging regions to image a subject.

An imaging region is a collection of at least one or more pixels. For example, an imaging region is the above-described one or more unit groups 202. The imaging region can set imaging conditions for each unit group 202. Specifically, an imaging condition includes the exposure time (shutter speed), the amplification factor (ISO sensibility), and the resolution as described above.

The imaging element 100 images a subject to output video data 910 including a plurality of frames to the preprocessing unit 900 in the control unit 502. An image region in the frame F is a region of image data imaged in a certain imaging region of the imaging element 100.

For example, when a certain imaging region is composed of one unit group 202 (2×2 pixels), the corresponding image region also has the size of the unit group 202. Similarly, when a certain imaging region is composed of 2×2 unit groups 202 (4×4 pixels), the corresponding image region also has the size of the 2×2 unit groups 202.

In FIG. 9, it is assumed that a main subject of a subject photographed by the frame F (e.g., a focused subject) is imaged based on the imaging condition A and the background region is imaged based on the imaging condition B. The imaging conditions A and B are imaging conditions that are the same type and that have different values. For example, assuming that the imaging conditions A and B are the exposure time, then the imaging condition A is 1/500 [seconds] and the imaging condition B is 1/60 [seconds], for example. If the imaging condition is the exposure time, the imaging condition is stored in the Tv value map 812 of the video file 600 shown in FIG. 8.

Similarly, when the imaging condition is the ISO sensibility, the imaging condition is stored in the Sv value map 813 of the video file 600 shown in FIG. 8. When the imaging condition is a frame rate, the imaging condition is stored in the additional information 817 of the video file 600 shown in FIG. 8.

The preprocessing unit 900 executes, with regard to the video data 910, the preprocessing of the image processing by the image processing unit 901. Specifically, when the preprocessing unit 900 receives the video data 910 from the imaging element 100 (in this case a collection of RAW image data), the preprocessing unit 900 uses the well-known subject detection technique to detect a specific subject such as a main subject, for example. The preprocessing unit 900 also predicts the imaging region of the specific subject to set the imaging condition of the imaging region in the imaging element 100 to a specific imaging condition.

For example, when the imaging condition B is set for the entire imaging face 200 and the specific subject such as the main subject is detected and imaged, the preprocessing unit 900 outputs the imaging condition A to the imaging element 100 so that the imaging region of the imaging element 100 in which the specific subject is imaged has the imaging condition A. This allows the imaging region of the specific subject to be set to the imaging condition A and to set imaging regions other than this imaging region to be set to the imaging condition B.

Specifically, the preprocessing unit 900 may detect the motion vector of the specific subject based on a difference between an imaging region in which the specific subject in the input frame is detected and an imaging region in which the specific subject of the inputted frame is detected to identify the imaging region of the specific subject in the next input frame. In this case, the preprocessing unit 900 outputs, to the imaging element 100, an instruction to change, with regard to the identified imaging region, the image condition to the imaging condition A. This allows the imaging region of the specific subject to be set to the imaging condition A and imaging regions other than the imaging region to be set to the imaging condition B.

The image processing unit 901 subjects the video data 910 inputted from the imaging element 100 to an image processing (e.g., a demosaic processing, a white balance adjustment, noise reduction, debayer). The compression unit 902 compresses the video data 910 inputted from the image processing unit 901. The compression unit 902 performs this compression by a hybrid encoding operation obtained by combining the motion compensation inter-frame prediction (Motion Compensation: MC) and the discrete cosine conversion (Discrete Cosine Transform: DCT) with the entropy coding.

In the motion detection, the compression unit 902 performs the block matching. The block matching is one example of a processing to detect a specific region. The block matching is a technique according to which a block having the frame F1 as a compression target is used as the target block b1 as a compression target region and the frame F2 inputted temporally previous to (or after) the frame F1 is used as a reference frame to detect the block b2 from the search range SR of the frame F2 that has the highest correlation degree with the target block b1. Then, a difference between the coordinate position of the block b2 detected by the block matching and the coordinate position of the target block b1 is used as the motion vector mv. The evaluation value of the correlation degree is generally a square error or an absolute value error.

The compression unit 902 is configured, when the target block b1 is image data imaged in the frame F1 based on the imaging condition A, to use the same position as that of the target block b1 in the frame F2 as a search window w. The shape of the search window w is not limited to a rectangle shape and may be any polygonal shape. The search range SR is a predetermined range having the search window w at the center thereof. The range of the search range SR may be defined as a compression reference. The compression unit 902 sets, in the frame F2, an overlapped region of the ranges of the search range SR and the imaging condition A as a search region SA to scan the search window w (represented by the arrow) in the search region SA to detect the block b2 having the highest correlation with the target block b1 to generate the motion vector mv. It is noted that the scanning is not limited to one pixel unit and also may be performed on an any unit such as a half pixel unit or a quarter pixel unit.

The main subject is imaged based on the imaging condition A. The target block b1 is a part of the main subject. The block b2 having the highest correlation with the target block b1 exists only in the imaging condition A. Thus, the only necessary operation is to search the search region SA that is the overlapped region of the ranges of the search range SR and the imaging condition A. As described above, since the search range SR may be narrowed down to the search region SA in advance, the search processing in the block matching can have a higher speed. Furthermore, the search range SR can be narrowed down to the search region SA that has the same imaging condition as the imaging condition of the target block b1, thus the decline of the block matching accuracy can be suppressed.

It is noted that the control unit 502 may execute the compression processing of the video data 910 from the imaging element 100 as a real-time processing or as a batch processing. For example, the control unit 502 may store the video data 910 from the imaging element 100, the preprocessing unit 900, or the image processing unit 901 once in the memory card 504, the DRAM 506, or the flash memory 507 to read, when there is a trigger issued automatically or issued by a user operation, the video data 910 to subject the resultant data to the compression processing by the compression unit 902.

<Configuration Example of the Control Unit 502>

Figure 10:
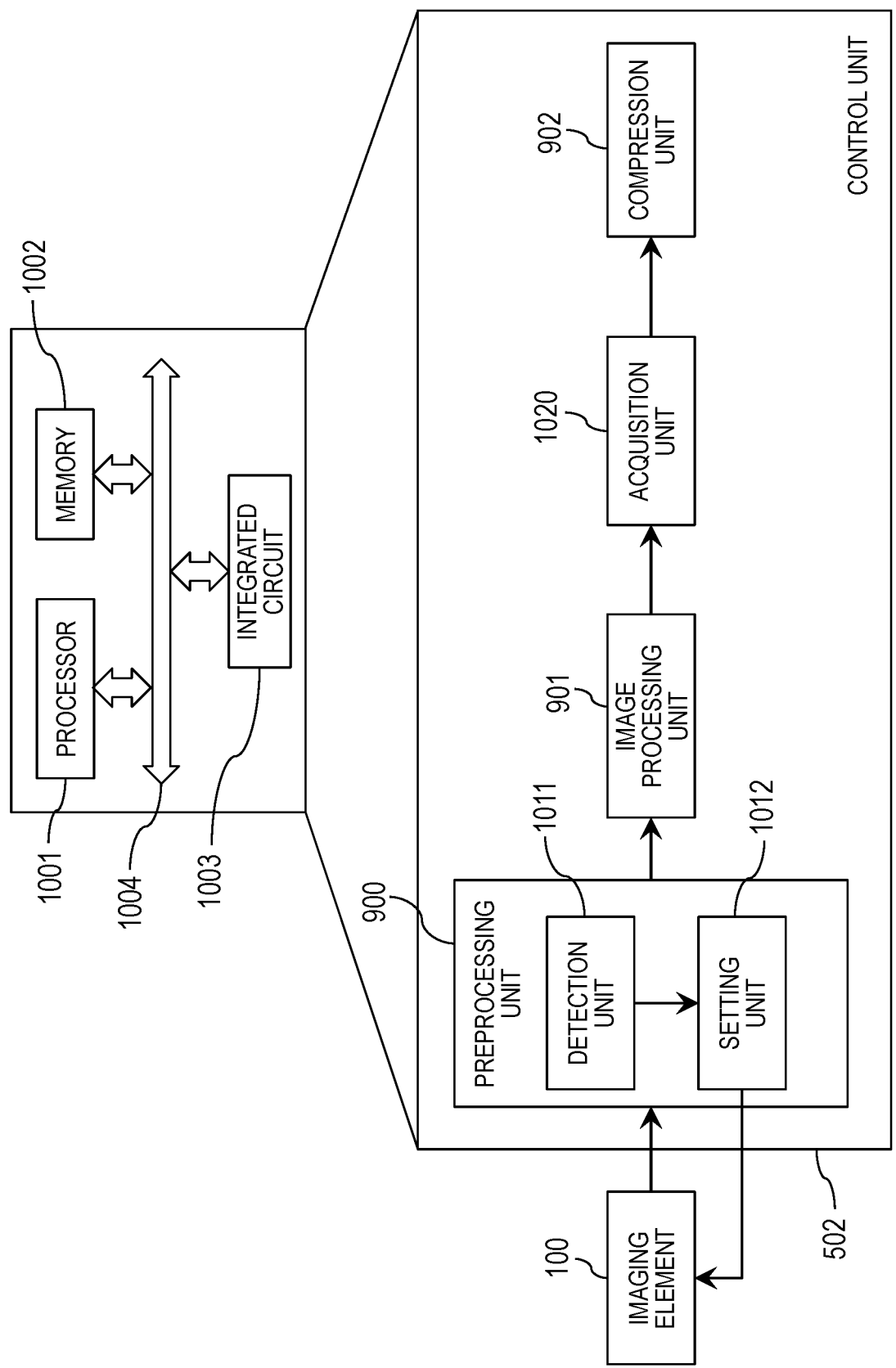
FIG. 10 is a block diagram illustrating a configuration example of the control unit shown in FIG. 5.

FIG. 10 is a block diagram illustrating a configuration example of the control unit 502 shown in FIG. 5. The control unit 502 has a preprocessing unit 900, the image processing unit 901, an acquisition unit 1020, and the compression unit 902. The control unit 502 is composed of a processor 1001, a memory 1002, an integrated circuit 1003, and a bus 1004 providing the connection thereamong.

The preprocessing unit 900, the image processing unit 901, the acquisition unit 1020, and the compression unit 902 may be realized by allowing a program stored in the memory 1002 to be executed by the processor 1001 or may be realized by the integrated circuit 1003 (e.g., ASIC (Application Specific Integrated Circuit) or FPGA (Field-Programmable Gate Array)). The processor 1001 may use the memory 1002 as a work area. The integrated circuit 1003 may use the memory 1002 as a buffer to temporarily retain various pieces of data including image data.

The preprocessing unit 900 subjects the video data 910 from the imaging element 100 to the preprocessing of the image processing by the image processing unit 901. Specifically, the preprocessing unit 900 has a detection unit 1011 and a setting unit 1012 for example. The detection unit 1011 detects a specific subject by the above-described well-known subject detection technique.

The setting unit 1012 applies the additional information 817 to the respective frames constituting the video data 910 from the imaging element 100. The setting unit 1012 changes the frame rate of an imaging region of the imaging face 200 of the imaging element 100 in which a specific subject is detected.

Specifically, the setting unit 1012 detects the motion vector of the specific subject from a difference between the imaging region in which a specific subject is detected in the input frame and an imaging region in which the specific subject of an inputted frame is detected for example to predict the imaging region of the specific subject at the next input frame. The setting unit 1012 outputs, to the imaging element 100, an instruction to change the specific imaging condition (e.g., the imaging condition A) for the predicted imaging region to the second frame rate.

The image processing unit 901 executes the image processing on the respective frames of the video data 910 outputted from the preprocessing unit 900. Specifically, the image processing unit 901 executes a known image processing such as a demosaic processing or white balance adjustment as described above, for example.

The acquisition unit 1020 retains the video data 910 outputted from the image processing unit 901 in the memory 1002 and outputs, at a predetermined timing, a plurality of frames included in the video data 910 one by one to the compression unit 90 in the order of time scales. Specifically, the compression unit 902 sets the overlapped region in the frame F2 of the ranges of the search range SR and the imaging condition A to the search region SA and scans the search window w in the search region SA (represented by the arrow) to detect the block b2 as described above, for example.

<Configuration Example of the Compression Unit 902>

Figure 11:
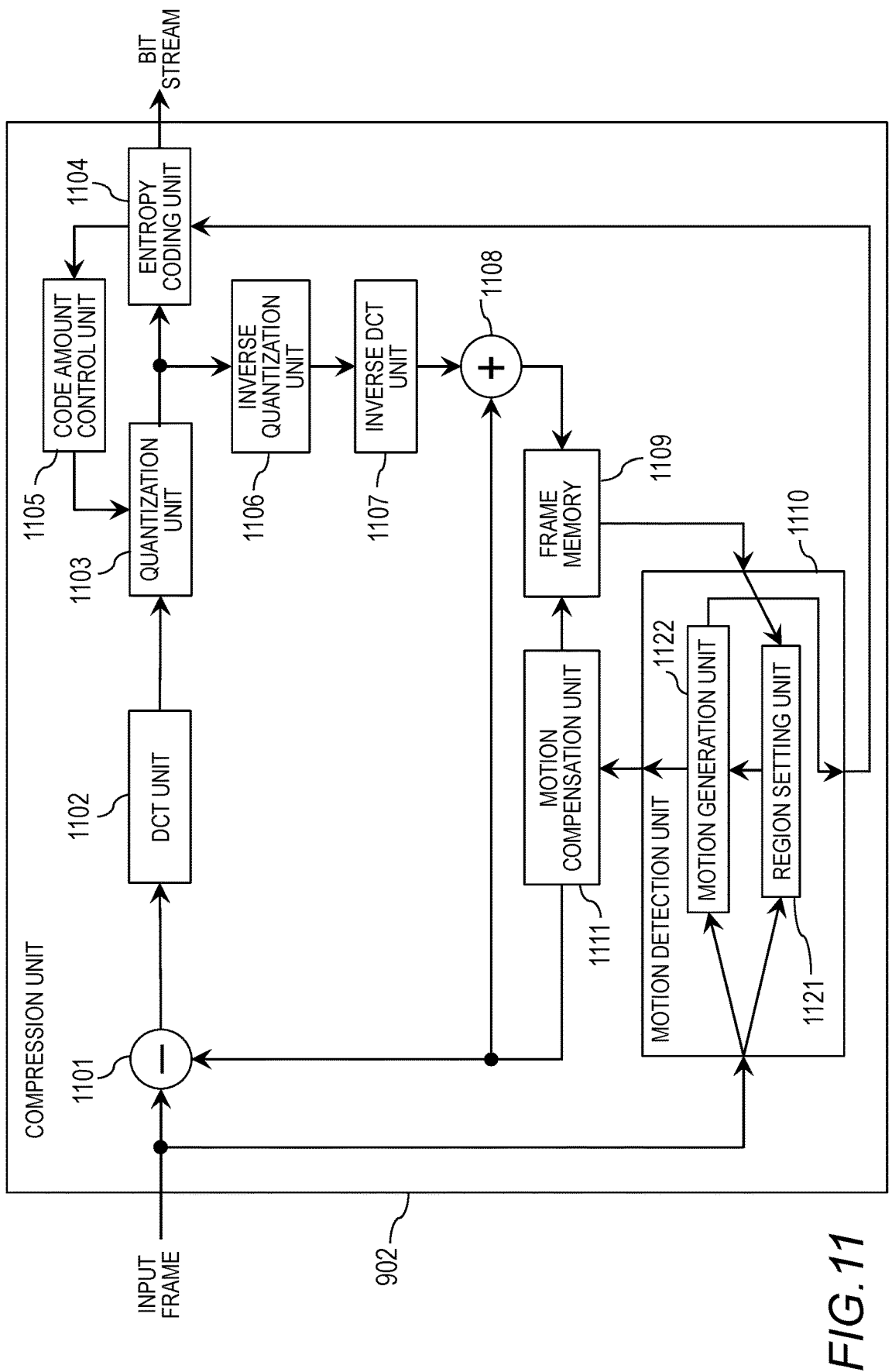
FIG. 11 is a block diagram illustrating the configuration of the compression unit.

FIG. 11 is a block diagram illustrating the configuration of the compression unit 902. As described above, the compression unit 902 compresses the respective frames of the video data 910 by the hybrid coding obtained by combining the motion compensation inter-frame predicted (MC) and the discrete cosine conversion (DCT) with the entropy coding.

The compression unit 902 includes a subtraction unit 1101, a DCT unit 1102, a quantization unit 1103, an entropy coding unit 1104, a code amount control unit 1105, an inverse quantization unit 1106, an inverse DCT unit 1107, a generation unit 1108, a frame memory 1109, a motion detection unit 1110, a motion compensation unit 1111, and a compression control unit 1312. The subtraction unit 1101 to the motion compensation unit 1111 have a configuration similar to that of the conventional compression unit.

Specifically, the subtraction unit 1101 subtracts, from an input frame, a prediction frame from the motion compensation unit 1111 that predicts the input frame to output difference data. The DCT unit 1102 subjects the difference data from the subtraction unit 1101 to the discrete cosine conversion.

The quantization unit 1103 quantizes the difference data subjected to the discrete cosine conversion. The entropy coding unit 1104 executes the entropy coding on the quantized difference data and also executes the entropy coding on the motion vector from the motion detection unit 1110.

The code amount control unit 1105 controls the quantization by the quantization unit 1103. The inverse quantization unit 1106 executes the inverse quantization on the difference data quantized by the quantization unit 1103 to obtain the difference data subjected to the discrete cosine conversion. The inverse DCT unit 1107 executes an inverse discrete cosine conversion on the difference data subjected to the inverse quantization.

The generation unit 1108 adds the difference data subjected to the inverse discrete cosine conversion to the prediction frame from the motion compensation unit 1111 to generate a reference frame that is referred to by a frame inputted temporally later than the input frame. The frame memory 1109 retains the reference frame obtained from the generation unit 1108.

The motion detection unit 1110 uses the input frame and the reference frame to detect a motion vector. The motion detection unit 1110 has a region setting unit 1121 and a motion generation unit 1122. In order to execute the motion detection, the region setting unit 1121 sets a search region for the block matching.

As described above, the block matching is a technique to set a block having the frame F1 as a compression target as a target block b1 and detects a block b2 that has the highest correlation degree with the target block b1 from among the search range SR of the frame F2 inputted temporally previous to (or after) the frame F1 to detect, as a motion vector mv, a difference between the coordinate position of the block b2 and the coordinate position of the target block b1 (see FIG. 9). The evaluation value of the correlation degree is generally a square error or an absolute value error.

The region setting unit 1121 is configured, when the target block b1 is image data imaged in the frame F1 based on the imaging condition A, to set, as a search window w, the same position as that of the target block b1 in the frame F2. The search range SR is a range having the search window w at the center thereof. The region setting unit 1121 sets, as the search region SA, the overlapped region in the frame F2 of the ranges of the search range SR and the imaging condition A.

The motion generation unit 1122 generates the motion vector my based on the target block b1 and the block b2. Specifically, the motion generation unit 1122 scans the search window w in the search region SA set by the region setting unit 1121 (represented by the arrow) to detect the block b2 having the highest correlation degree with the target block b1, for example. The motion generation unit 1122 generates, as the motion vector mv, a difference between the coordinate position of the block b2 and the coordinate position of the target block b1.

As described above, the search range SR can be narrowed down to the search region SA in advance, thus the search processing of the block matching having a higher speed can be provided. Furthermore, the search range SR can be narrowed down to the search region SA having the same imaging condition as the imaging condition of the target block b1, thus the decline of the block matching accuracy can be suppressed.

The motion compensation unit 1111 uses the reference frame and the motion vector to generate the prediction frame.

Specifically, the motion compensation unit 1311 uses a specific reference frame among a plurality of reference frames retrained by the frame memory 1109 and a motion vector mv for example to execute the motion compensation. The use of the reference frame as a specific reference frame can suppress the high-load motion compensation that requires reference frames other than the specific reference frame. Furthermore, the specific reference frame set as one reference frame obtained from the temporally-previous frame of the input frame can avoid the high-load motion compensation and can reduce the motion compensation processing load.

<Scanning Example of the Search Window>

Next, the following section will describe the scanning example of the search window w with reference to FIG. 12 to FIG. 19. The description will be made using the frame F2 shown in FIG. 9.

Figure 12:
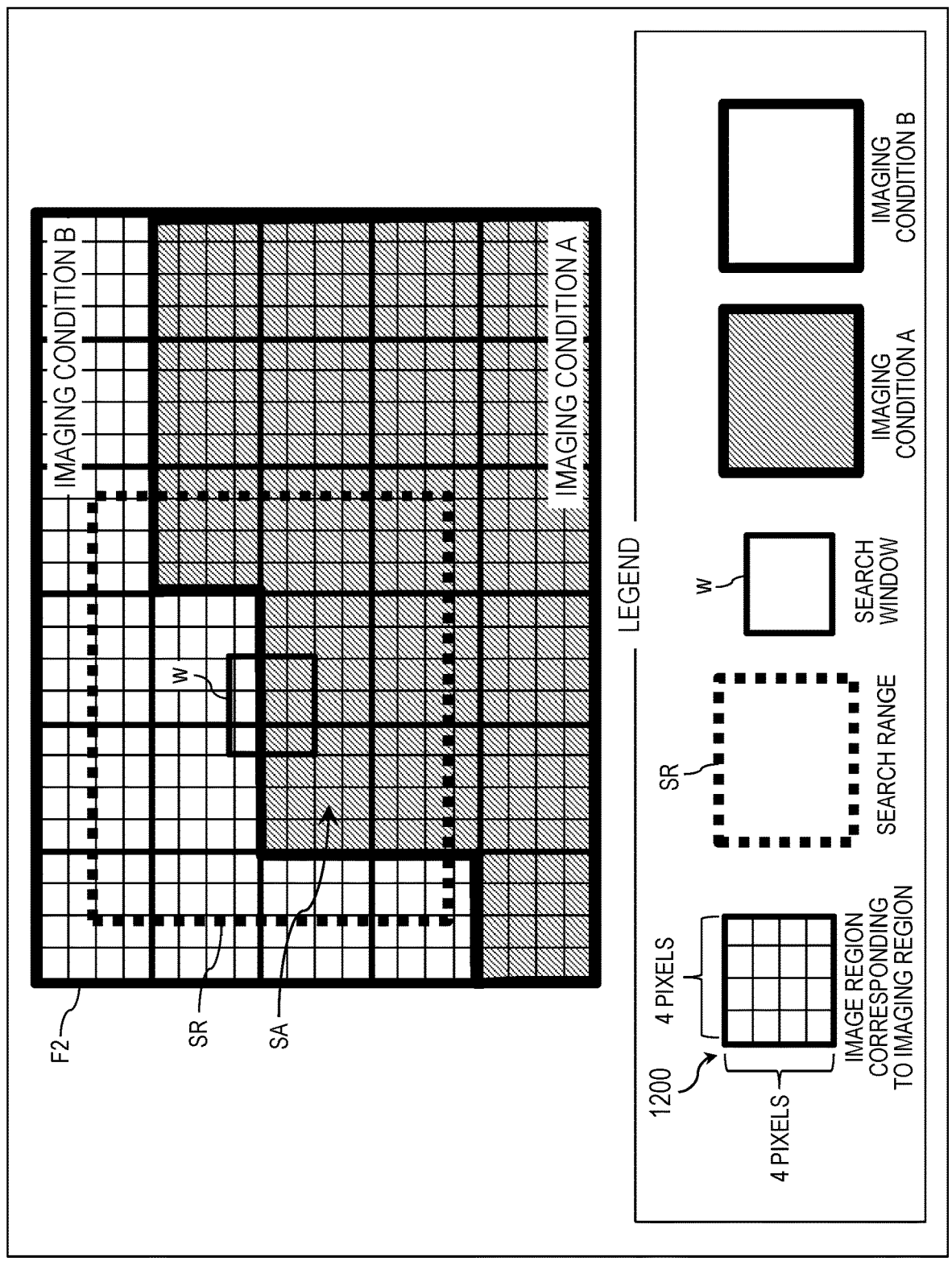
FIG. 12 illustrates the examples of the search range, the search region, and the search window.

FIG. 12 illustrates the examples of the search range, the search region, and the search window. The illustration in FIG. 12 pays attention on a part of the frame F2 (specifically, the boundary between the imaging conditions A and B). An image region 1200 is a region in the frame F2 corresponding to an imaging region of the frame F2 and corresponds to 4×4 pixels (i.e., 2×2 unit groups 202), for example. In FIG. 12, the frame F2 is composed of 4×5 image regions 1200.

It is noted that, in FIG. 12, the imaging conditions are set based on an imaging region unit corresponding to the image region 1200 (i.e., 2×2 unit groups 202) as one example. However, the imaging conditions also may be set based on an imaging unit composed of one unit group 202 or units larger than 2×2 unit groups 202. It is noted that the search window w has a size of 3×3 pixels.

The motion generation unit 1122 may scan the search window w in the search region SA so that the search window w at the boundary of the imaging conditions A and B does not include any single pixel of a region of the imaging condition B or may scan both regions of the imaging conditions A and B or may scan a region of the imaging condition B only that is away from the imaging condition A by predetermined pixels. The following section will describe this in this order. It is noted that, in FIG. 13 to FIG. 19, the legend of FIG. 12 is used.

In FIG. 13 to FIG. 19, the description will be made while paying attention on 4×4 image regions 1200 including the boundary of the imaging conditions A and B (the upper-left image region 1200 is assumed as an image region 1201, the upper-right image region 1200 is assumed as an image region 1202, the lower-left image region 1200 is assumed as an image region 1203, and the lower-right image region 1200 is assumed as an image region 1204). The search window w is scanned in the right direction from the upper left of the frame F2 (white thick arrow) to reach the right end. When the search window w reaches the right end, the search window w is shifted by one pixel and is scanned from the left end to the right end (raster scan). However, a so-called diamond scanning performed from the center in a radial manner may be used.

It is noted that the scanning width from the left end to the right end of the search window w may be within the number of pixels in the direction along which the search window w is scanned (3 pixels in this example). Similarly, the shift width of the search window w in the lower direction is not limited to one pixel and may be within the number of pixels of the width of the direction along which the search window w is shifted (3 pixels in this example).

Figure 13:
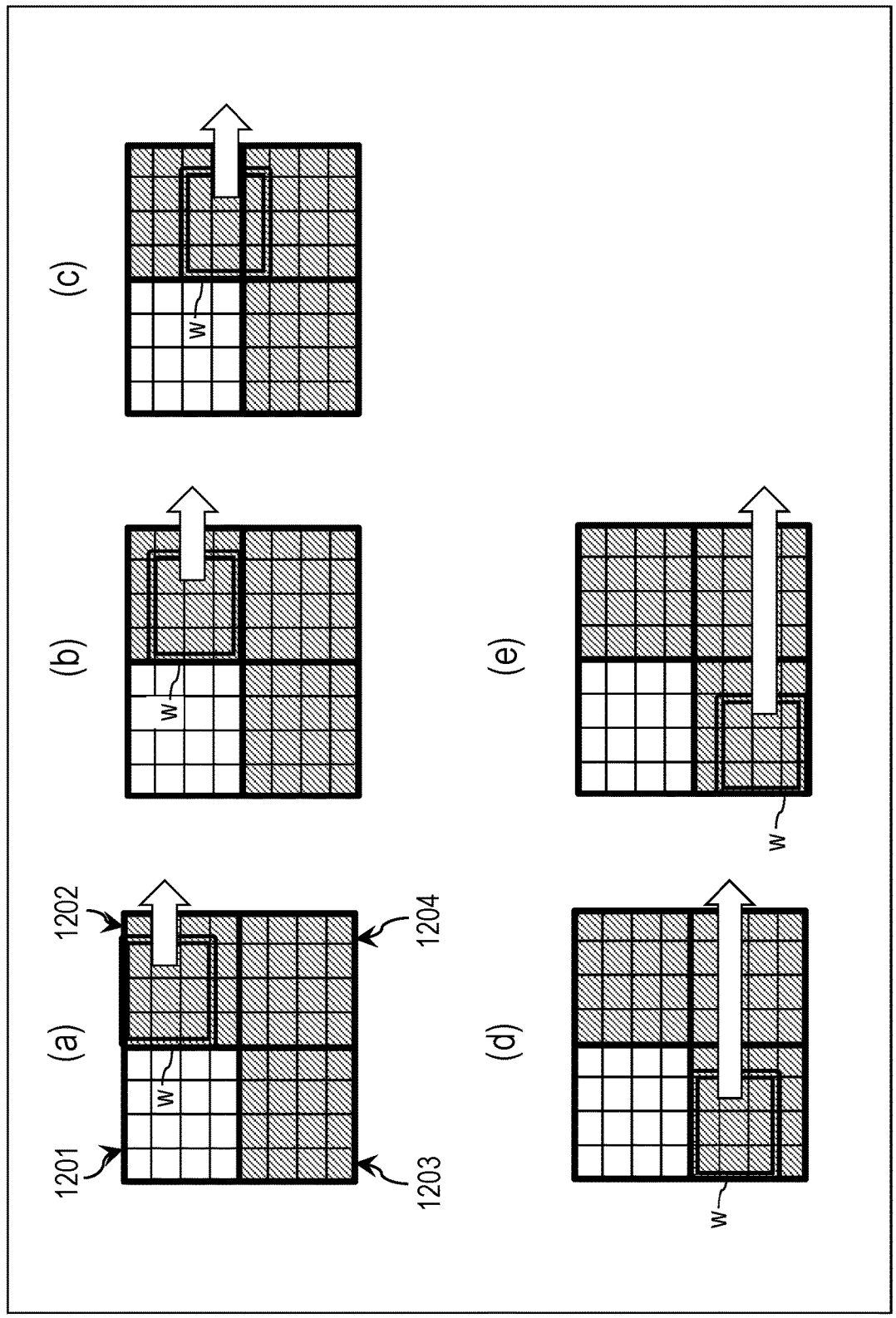
FIG. 13 illustrates the scanning example 1 at the boundary between different imaging conditions.

FIG. 13 illustrates the scanning example 1 at the boundary between different imaging conditions. In FIG. 13, (a)-(e) of FIG. 13 are shown in the order of time scales. In the scanning example 1, the motion generation unit 1122 scans the search window w so as to include regions of the imaging condition A only. Thus, in (a)-(e) of FIG. 13, the search window w does not include regions of the imaging condition B.

Figure 14:
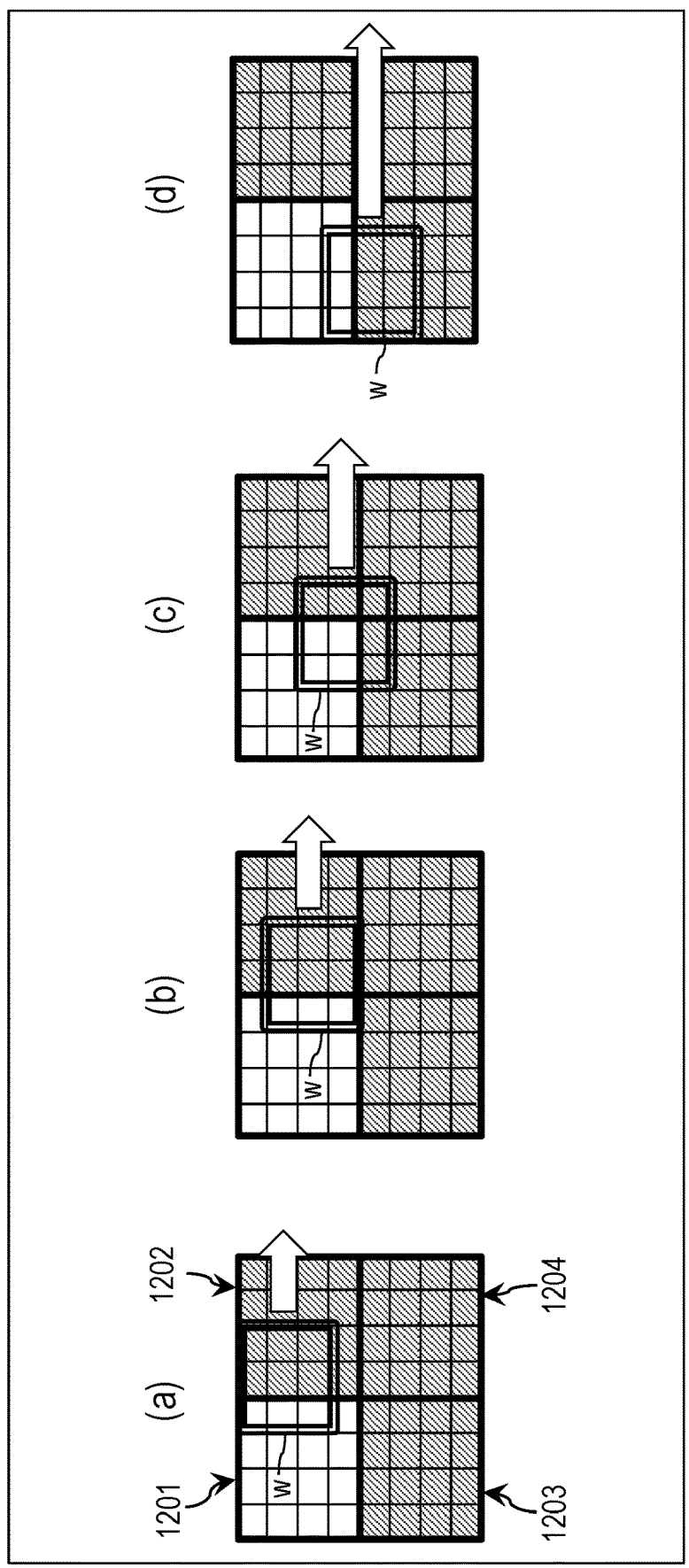
FIG. 14 illustrates the scanning example 2 at the boundary between different imaging conditions.

FIG. 14 illustrates the scanning example 2 at the boundary between different imaging conditions. In FIG. 14, (a)-(e) of FIG. 14 are shown in the order of time scales. In the scanning example 2, the motion generation unit 1122 scans the search window w at the boundary of the imaging conditions A and B so that the region of the imaging condition A is always larger than the region of the imaging condition B. The 9 pixels of the search window w include the region of the imaging condition A that is composed of 6 pixels in (a) of FIG. 14 and that is composed of 6 pixels in (b) of FIG. 14 and that is composed of 5 pixels in (c) of FIG. 14 and that is composed of 6 pixels in (d) of FIG. 14. In the scanning after FIG. 14(d), the same scanning operations as those of (d) of FIGS. 13 and (e) of FIG. 13 are performed.

Figure 15:
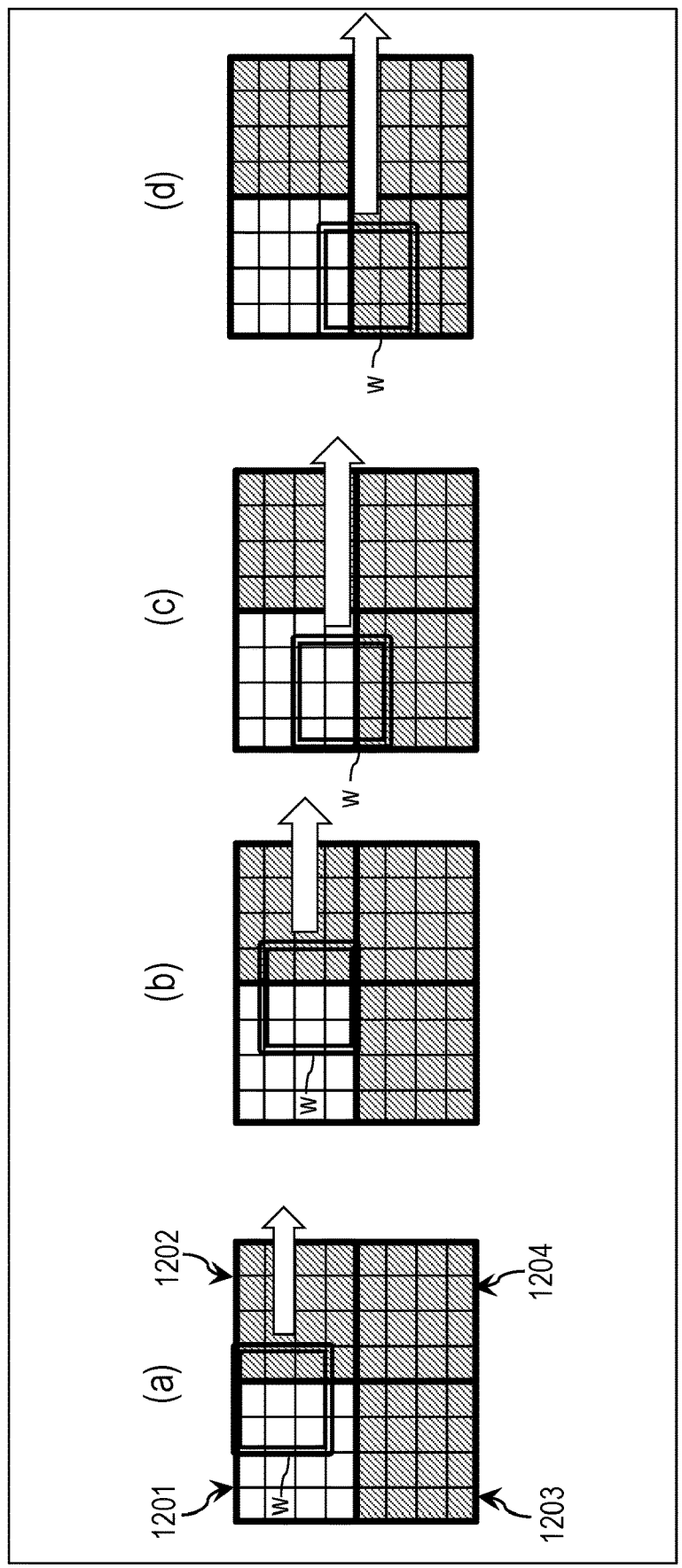
FIG. 15 illustrates the scanning example 3 at the boundary between different imaging conditions.

FIG. 15 illustrates the scanning example 3 at the boundary between different imaging conditions. In FIG. 15, (a)-(d) of FIG. 15 are shown in the order of time scales. In the scanning example 2, the motion generation unit 1122 scans the search window w at the boundary of the imaging conditions A and B so that the region of the imaging condition B is larger than the region of the imaging condition A as much as possible. The 9 pixels of the search window w include the region of the imaging condition B that is composed of 6 pixels in (a) of FIG. 15 and that is composed of 6 pixels in (b) of FIG. 15 and that is composed of 6 pixels in (c) of FIG. 15. In the scanning position of (d) of FIG. 15 one line down from (c) of FIG. 15, the region of the imaging condition B is composed of 3 pixels at the lower end of the image region 1201. In the scanning after (d) of FIG. 15, the same scanning operations as those of (d) and (e) of FIG. 13 are performed.

Figure 16:
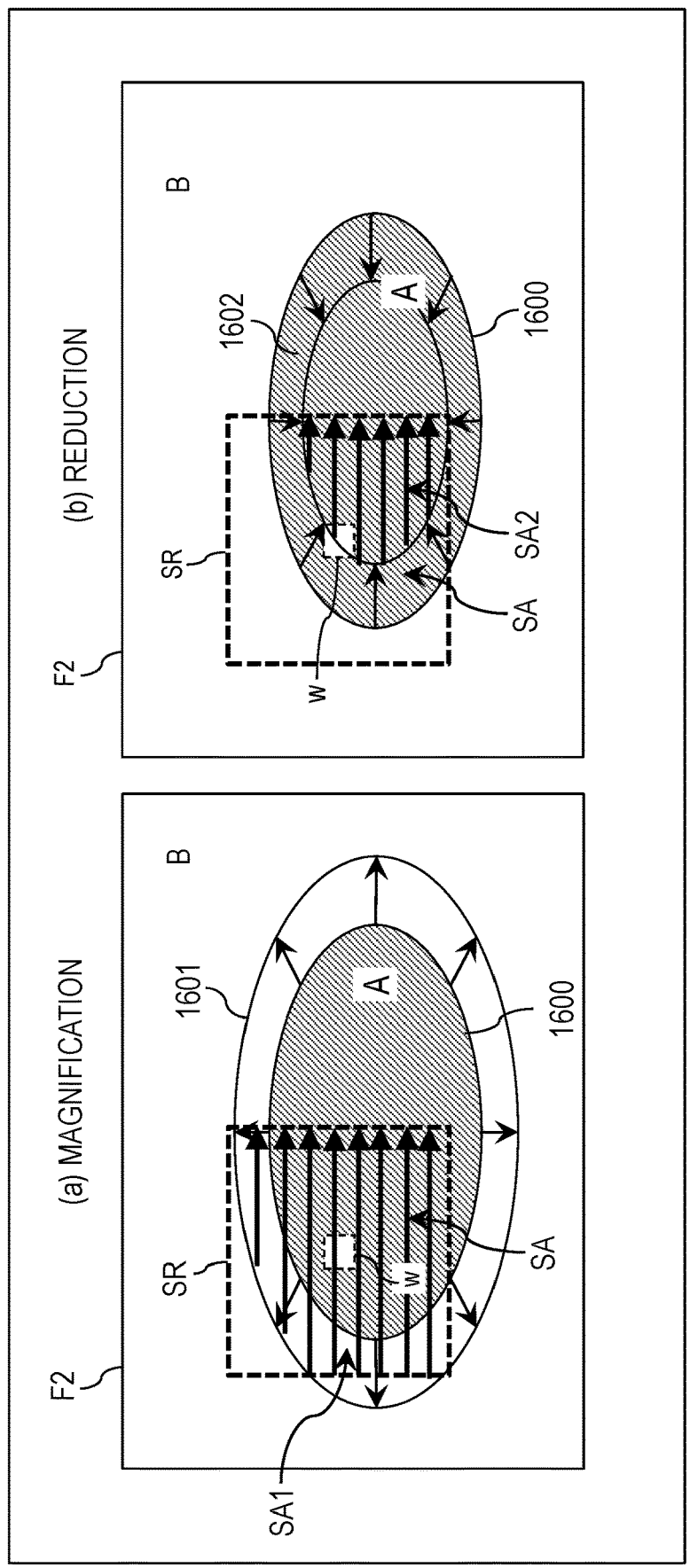
FIG. 16 illustrates the region magnification/reduction example of the imaging condition.

FIG. 16 illustrates the region magnification/reduction example of the imaging condition. In FIG. 16, (a) of FIG. 16 illustrates the magnification example and (b) of FIG. 16 illustrates the reduction example. When image regions having different imaging conditions are adjacent to each other, the video compression apparatus magnifies/reduces the search region SA from the viewpoint of reducing the processing load of the block matching or suppressing the decline of the block matching accuracy.

For example, it is assumed that image regions adjacent to each other have imaging conditions A and B. It is assumed that the imaging condition A has an image region of a specific subject while the imaging condition B has an image region of a background. It is assumed that an imaging condition is an exposure time (shutter speed).

For example, if the imaging condition A has the exposure time of 1/30 [seconds] and the imaging condition B has the exposure time of 1/60 [seconds], then there is a small difference between the exposure times. Thus, there may be a possibility where the main subject exists in the image region of the imaging condition B. Thus, if the difference between the imaging conditions A and B is equal to or a lower than threshold value T1, the region setting unit 1121 magnifies the search region SA of the imaging condition A. This can consequently suppress the decline of the block matching accuracy.

When the imaging condition A has the exposure time of 1/30 [seconds] while the imaging condition B has the exposure time of 1/1000 [seconds] for example, there is a large difference between the exposure times. Thus, there may be a possibility where the main subject does not exist in the image region of the imaging condition B. Thus, if the difference between the imaging conditions A and B exceeds a threshold value T2 (T2≥T1), the region setting unit 1121 reduces the search region SA of the imaging condition A. This can consequently reduce the processing load of the block matching.

When the subject includes a dark space and a bright space and the dark space includes therein the main subject, the dark space must have an exposure time longer than that of the bright space. Thus, the region setting unit 1121 sets the dark space to have the exposure time of the imaging condition A and sets the bright space to have the exposure time of the imaging condition B (the imaging condition A is long time-second than the imaging condition B). Then, the region setting unit 1121 reduces the search region SA of the imaging condition A. This can consequently reduce the processing load of the block matching.

It is noted that, although the case was described in which the imaging condition was the exposure time, the invention also may be applied to the case where the imaging condition is the ISO sensibility or the resolution. The following section will specifically describe an example in which the region of the imaging condition is magnified or reduced.

In (a) of FIG. 16, the region setting unit 1121 magnifies the outer edge 1600 of the region of the imaging condition A to the outer side (i.e., magnifies the outer edge 1600 of the region of the imaging condition A to the region side of the imaging condition B) to provide an outer edge 1601. However, the imaging condition B between the outer edge 1600 and the outer edge 1601 is left unchanged. The search region SA1 after the magnification becomes a region in the search range SR that is provided in the region of the imaging condition A and the region between the outer edge 1601 and the outer edge 1600. This allows the search region SA to be magnified to the search region SA1. Thus, the outer side of the search region SA also can be set as a block matching target, thus providing a higher block matching accuracy than in the case where the search region SA is searched.

In (b) of FIG. 16, the region setting unit 1121 reduces the outer edge 1600 of the region of the imaging condition A to the inner side (i.e., reduces the outer edge 1600 of the region of the imaging condition A to the region side of the imaging condition A) to provide an outer edge 1602. However, the imaging condition A between the outer edge 1600 and the outer edge 1602 is left unchanged. The search region SA2 after the reduction becomes a region obtained by subtracting, from the search region SA, a region between the outer edge 1600 and the outer edge 1602. This allows the search region SA to be reduced to the search region SA2. Thus, the region of the imaging condition A at the outer side of the search region SA2 can be excluded from the block matching target, thus providing a block matching processing that has a higher speed than in the case where the search region SA is searched.

It is noted that the region setting unit 1121 in FIG. 16 sets the search region SA to subsequently magnify the search region SA. However, another configuration may be used in which, when the search region SA is set, the search region SA1 may be set to include the image region of the imaging condition B surrounding the image region of the imaging condition A.

Figure 17:
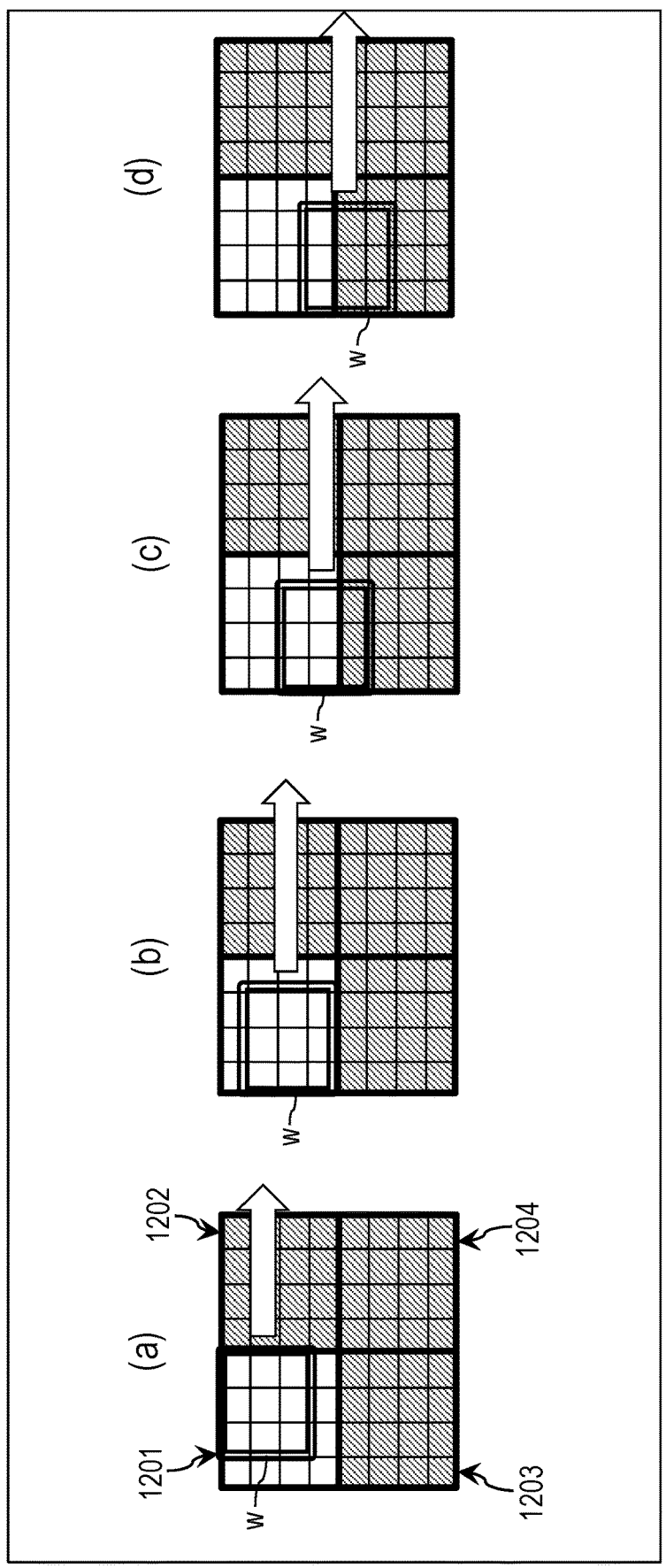
FIG. 17 illustrates the scanning example 4 at the boundary between different imaging conditions.

FIG. 17 illustrates the scanning example 4 at the boundary between different imaging conditions. In FIG. 17, (a)-(d) of FIG. 17 are shown in the order of time scales. In the scanning example 4, the motion generation unit 1122 is the scanning example of the search window w in the search region SA1 shown in (a) of FIG. 16. In the scanning example 4, the motion generation unit 1122 scans the search window w so that the search window w is abutted to the boundary of the imaging conditions A and B as much as possible and includes the region of the imaging condition B. In the scanning position of (c) of FIG. 17 one line down from (b) of FIG. 17, the search window w includes the region of the imaging condition A. Similarly, in the scanning position of (d) of FIG. 17 one line down from (c) of FIG. 17, the search window w includes the region of the imaging condition A.

Figure 18:
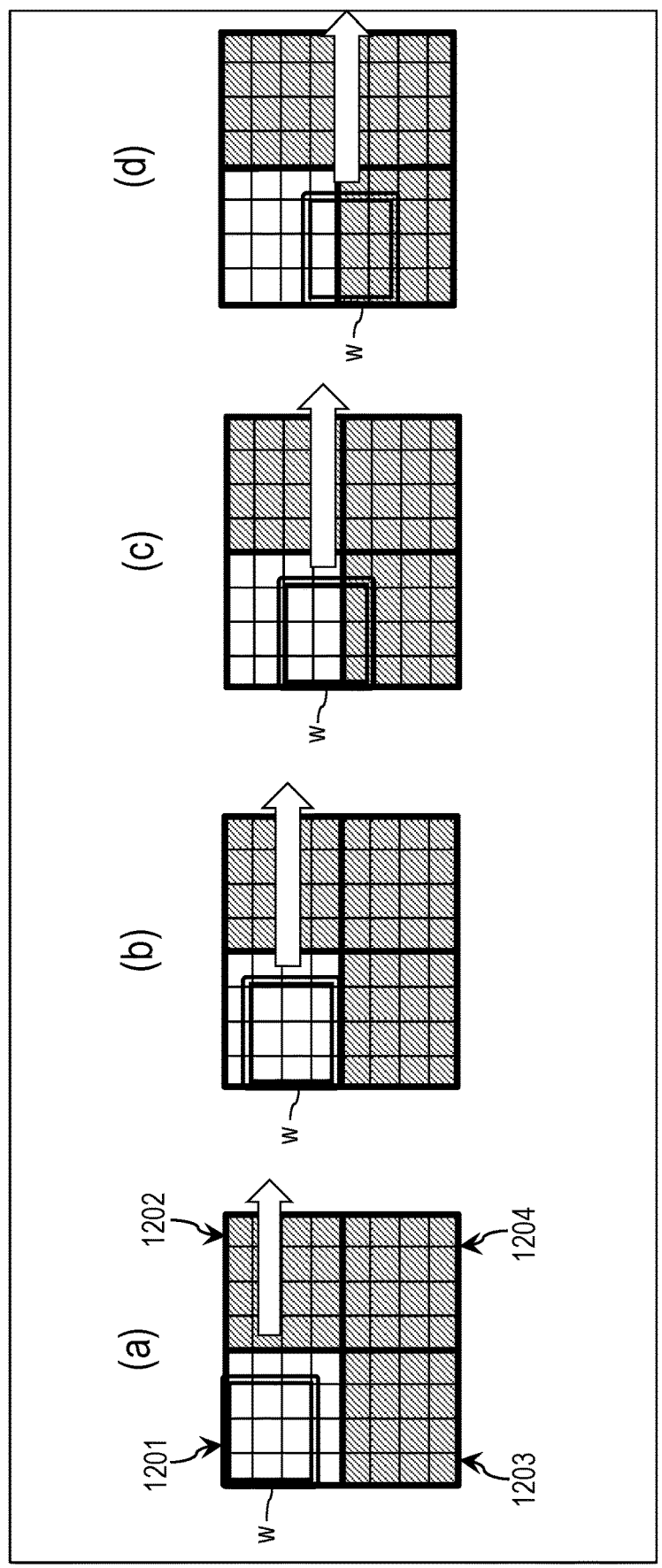
FIG. 18 illustrates the scanning example 5 at the boundary between different imaging conditions.

FIG. 18 illustrates the scanning example 5 at the boundary between different imaging conditions. In FIG. 18, (a)-(d) of FIG. 18 are shown in the order of time scales. In the scanning example 5, the motion generation unit 1122 is the scanning example of the search window w in the search region SA1 shown in (a) of FIG. 16. In the scanning example 5, the motion generation unit 1122 scans the search window w so that the search window w does not abutted to the boundary of the imaging conditions A and B and includes the region of the imaging condition B.

In (a) of FIG. 18, the search window w is at a position one pixel away from the imaging condition A in the left and upper directions. In (b) of FIG. 18, the search window w is at a position one pixel away from the imaging condition A in the left direction. At the scanning position of (c) of FIG. 18 one line down from (b) of FIG. 18, the search window w includes the region of the imaging condition A. Similarly, at the scanning position of (d) of FIG. 18 one line down from (c) of FIG. 18, the search window w includes the region of the imaging condition A.

Figure 19:
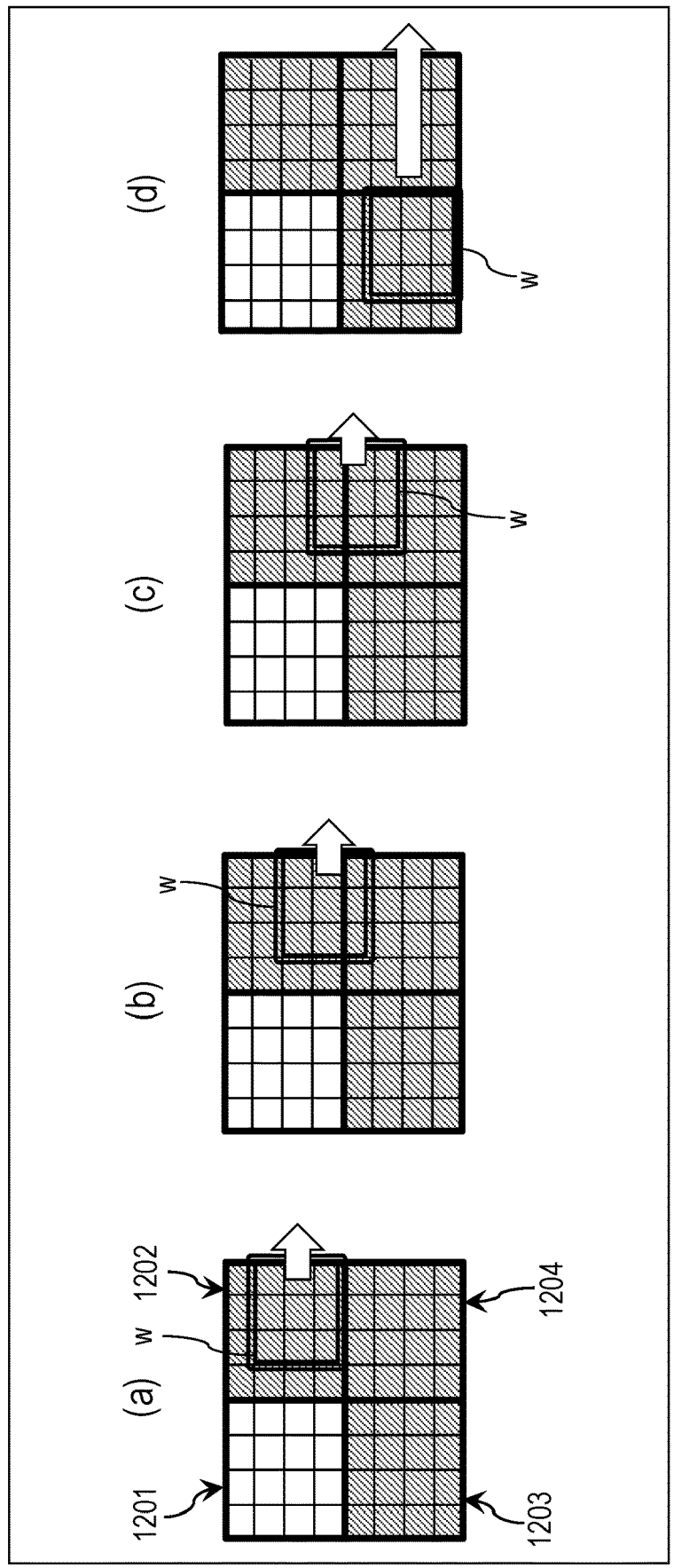
FIG. 19 illustrates the scanning example 6 at the boundary between different imaging conditions.

In FIG. 19, (a)-(d) in FIG. 19 illustrate the scanning example 6 at the boundary between different imaging conditions. (a)-(d) in FIG. 19 are shown in the order of time scales. In the scanning example 6, the motion generation unit 1122 is the scanning example of the search window w in the search region SA2 shown in (b) of FIG. 16. In the scanning example 6, the motion generation unit 1122 scans the search window w so that the search window w does not always include the region of the imaging condition B.

In this manner, at the boundary between the image regions of the different imaging conditions A and B, the reduction of the processing load and the suppression of the decline of the accuracy can be adjusted for the block matching. In particular, the motion generation unit 1122 can execute the block matching so that the search window w includes pixels of the imaging condition A only to thereby pay a particular attention on the reduction of the processing load of the block matching at the boundary of the image regions of the different imaging conditions.

Furthermore, the motion generation unit 1122 can execute the block matching so that the number of pixels of the imaging condition A in the search window w is higher than the number of pixels of the imaging condition B to thereby achieve, in the block matching at the boundary of the image regions of the different imaging conditions, the suppression of the decline of the accuracy while prioritizing the reduction of the processing load.

Furthermore, the motion generation unit 1122 can execute the block matching so that the search window w includes therein at least one pixel of the imaging condition A to thereby achieve, in the block matching at the boundary of the image regions of the different imaging conditions, the suppression of the decline of the accuracy while maintaining the reduction of the processing load.

<Preprocessing Procedure Example>

Figure 20:
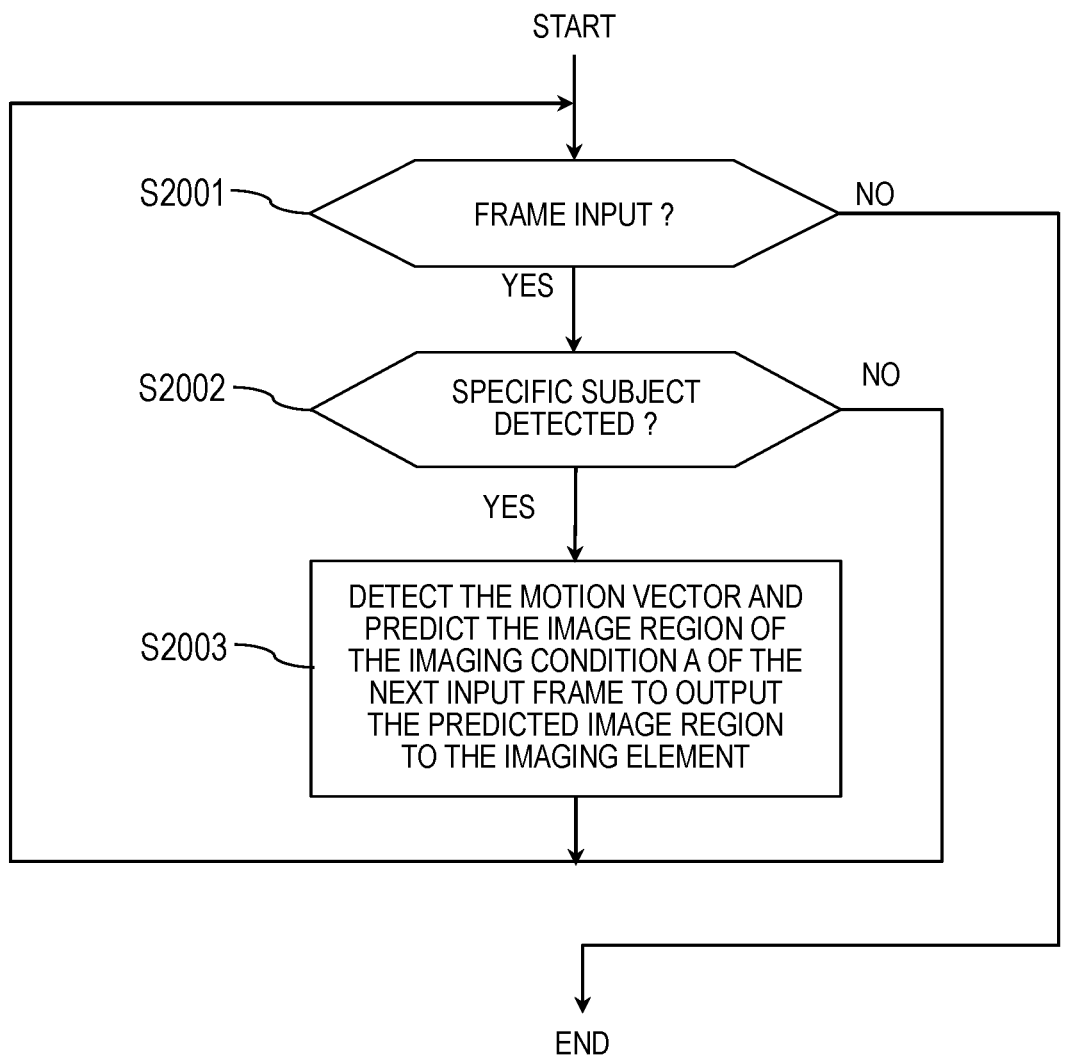
FIG. 20 is a flowchart illustrating the preprocessing procedure example by the preprocessing unit.

FIG. 20 is a flowchart illustrating the preprocessing procedure example by the preprocessing unit 900. In FIG. 20, the imaging element 100 has the imaging condition B in advance. The subject detection technique of the detection unit 1011 is used to track the image region having the imaging condition A to feedback the result to the imaging element 100. It is noted that the image regions of the imaging condition A and B may be always fixed.

The preprocessing unit 900 waits for the input of the frames constituting the first video data 910 (Step S2001: No). Upon receiving the input of the frames (Step S2001: Yes), the preprocessing unit 900 judges whether or not a specific subject such as a main subject is detected by the detection unit 1011 (Step S2002). When no specific subject is detected (Step S2002: No), the processing proceeds to Step S2001.

When a specific subject is detected (Step S2002: Yes) on the other hand, the preprocessing unit 900 uses the detection unit 1011 to compare the temporally-previous previous frame (e.g., a reference frame) with the input frame to detect a motion vector to predict the image region of the imaging condition A for the next input frame to output the predicted image region to the imaging element 100 to proceed to Step S2001 (Step S2003). This allows the imaging element 100 sets the imaging conditions for the unit group 202 constituting the imaging region corresponding to the predicted image region to the imaging condition A and sets the imaging conditions for the remaining unit group 202 to the imaging condition B to image the subject.

Then, the processing returns to Step S2001. When no frame is inputted (Step S2001: No) and the input of all frames constituting the video data 910 is completed, a series of processings are completed.

<Motion Vector Detection Processing Procedure>

Next, the following section will describe a detection processing procedure example of the motion vector mv by a motion detection unit 1110. The flowchart described below shows the detection processing procedure example of the motion vector mv of the imaging condition A under which a specific subject image may exist.

Figure 21:
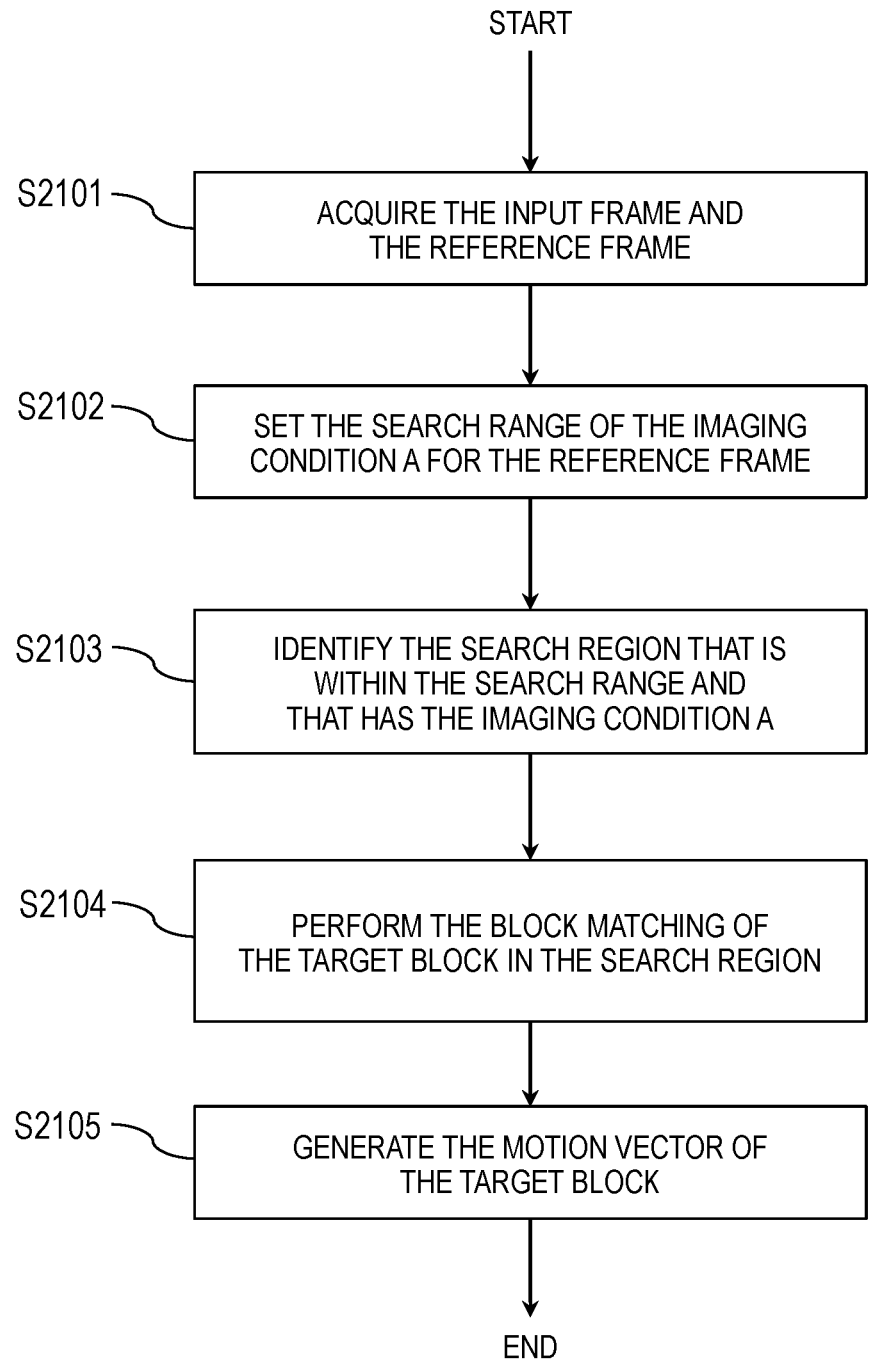
FIG. 21 is a flowchart illustrating the motion detection processing procedure example 1 by the motion detection unit.

FIG. 21 is a flowchart illustrating the motion detection processing procedure example 1 by the motion detection unit 1110. First, the motion detection unit 1110 acquires an input frame as a compression target and a reference frame in a frame memory (Step S2101). The motion detection unit 1110 sets the search range SR of the imaging condition A for the reference frame (Step S2102). Specifically, the motion detection unit 1110 sets the target block b1 in the input frame from the image region of the imaging condition A and sets, in the reference frame, the search window w at the same position as that of the target block b1, for example. Then, the motion detection unit 1110 sets the search range SR having the search window w at the center thereof as the reference frame (see FIG. 12).

Next, the motion detection unit 1110 identifies the search region SA that is within the search range SR and that is the image region of the imaging condition A (Step S2103). Then, the motion detection unit 1110 allows the motion generation unit 1122 to scan the search window w in the identified search region SA to thereby execute the block matching on the target block b1 (Step S2104) to generate the motion vector mv from the block b2 to the target block b1 (Step S2105).

Through the block matching, the motion detection unit 1110 detects, from the reference frame, the block b2 having the highest correlation degree with the target block b1 to generate, as the motion vector mv, a difference between the coordinate position of the block b2 and the coordinate position of the target block b1, for example. The evaluation value of the correlation degree may be a square error or an absolute value error, for example. Thereafter, a series of processings are completed.

As described above, the search range SR can be narrowed down to the search region SA in advance, thus a higher speed in the search processing of the block matching can be provided. Furthermore, the search range SR can be narrowed down to the search region SA having the same imaging condition as the imaging condition of the target block b1, thus the decline of the block matching accuracy can be suppressed.

Figure 22:
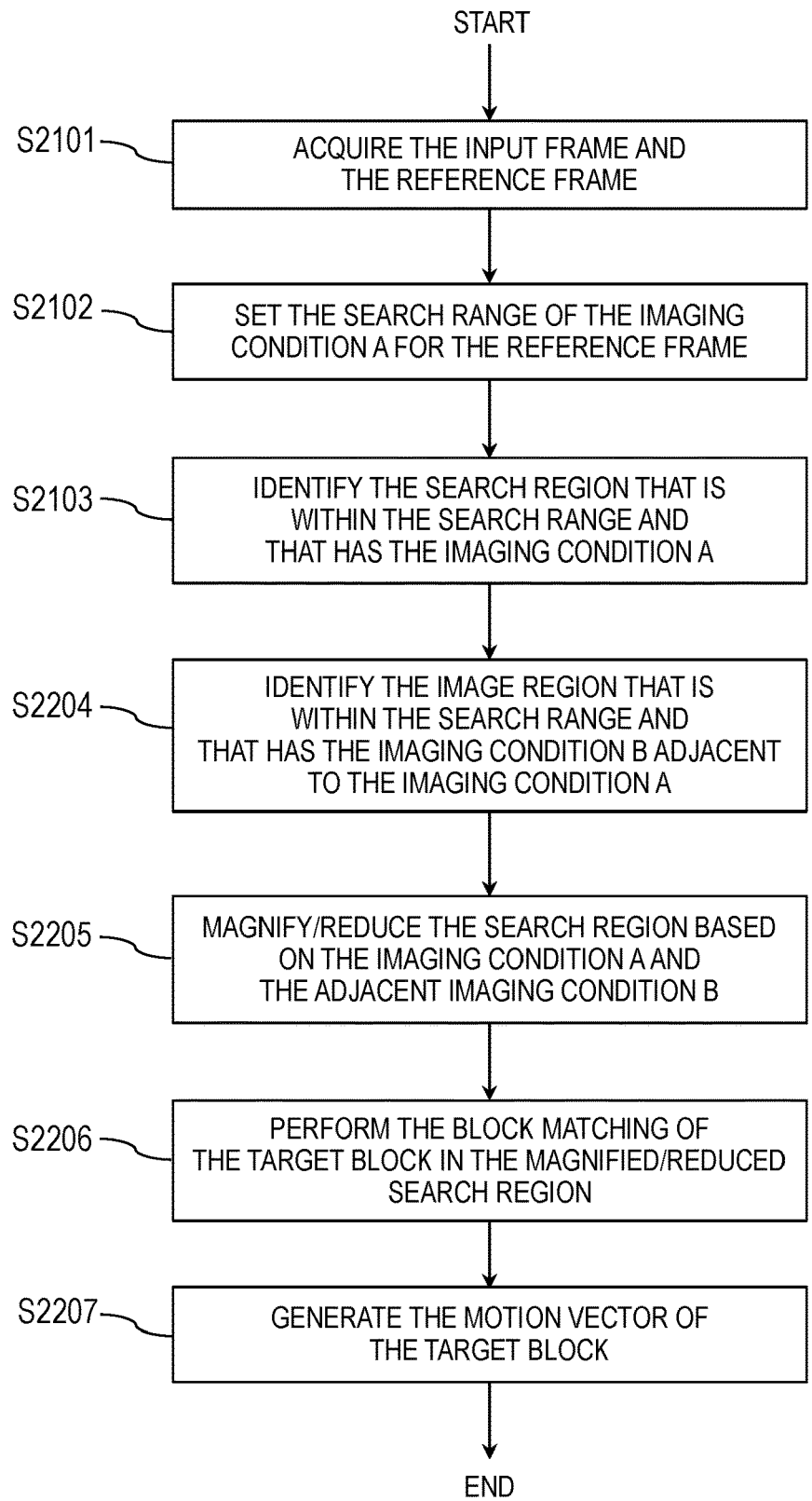
FIG. 22 is a flowchart illustrating the motion detection processing procedure example 2 by the motion detection unit.

FIG. 22 is a flowchart illustrating the motion detection processing procedure example 2 by the motion detection unit 1110. In the motion detection processing procedure example 2 of FIG. 22, the processing example will be described that is used to magnify/reduce the search region SA of the imaging condition. It is noted that the imaging conditions A and B may be set by allowing a user to operate the operation unit 505 or may be automatically set by the electronic device 500 depending on the light reception amounts of the respective unit groups 202 of the imaging element 100. The same processings as those of FIG. 21 are given with the same step number and will not be described further.

After Step S2103, the motion detection unit 1110 allows the region setting unit 1121 to identify the image region of the imaging condition B that is within the search range SR and that is adjacent to the imaging condition A (Step S2204). Then, the motion detection unit 1110 allows the region setting unit 1121 to magnify or reduce the search region SA identified in Step S2103 based on the image region of the imaging condition A and the image region of the imaging condition B adjacent to the image region (Step S2205). Specifically, the region setting unit 1121 magnifies/reduces the search region SA as shown in FIG. 16, for example.

As in S2104 and S2105, the motion detection unit 1110 allows the motion generation unit 1122 to scan the search window w in the magnified/reduced search region SA to thereby execute the block matching of the target block b1 (Step S2206) to generate the motion vector mv from the block b2 to the target block b1 (Step S2207).

This can consequently selectively achieve, depending on the magnification/reduction of the search region SA, the suppression of the decline of the block matching accuracy or the reduction of the processing load of the block matching.

<Block Matching Example at Different Pixel Accuracies>

Next, the following section will describe an example of the block matching at different pixel accuracies. The above-described example was described in which, regardless of the type of the imaging condition, the motion detection unit 1110 executes the block matching on the search region SA of the imaging condition A in the search range SR (including the magnified/reduced one) and no block matching is executed on the remaining image regions of the search range SR. The following section will describe an example in which the block matching is executed in the search region SA at different pixel accuracies.

Figure 23:
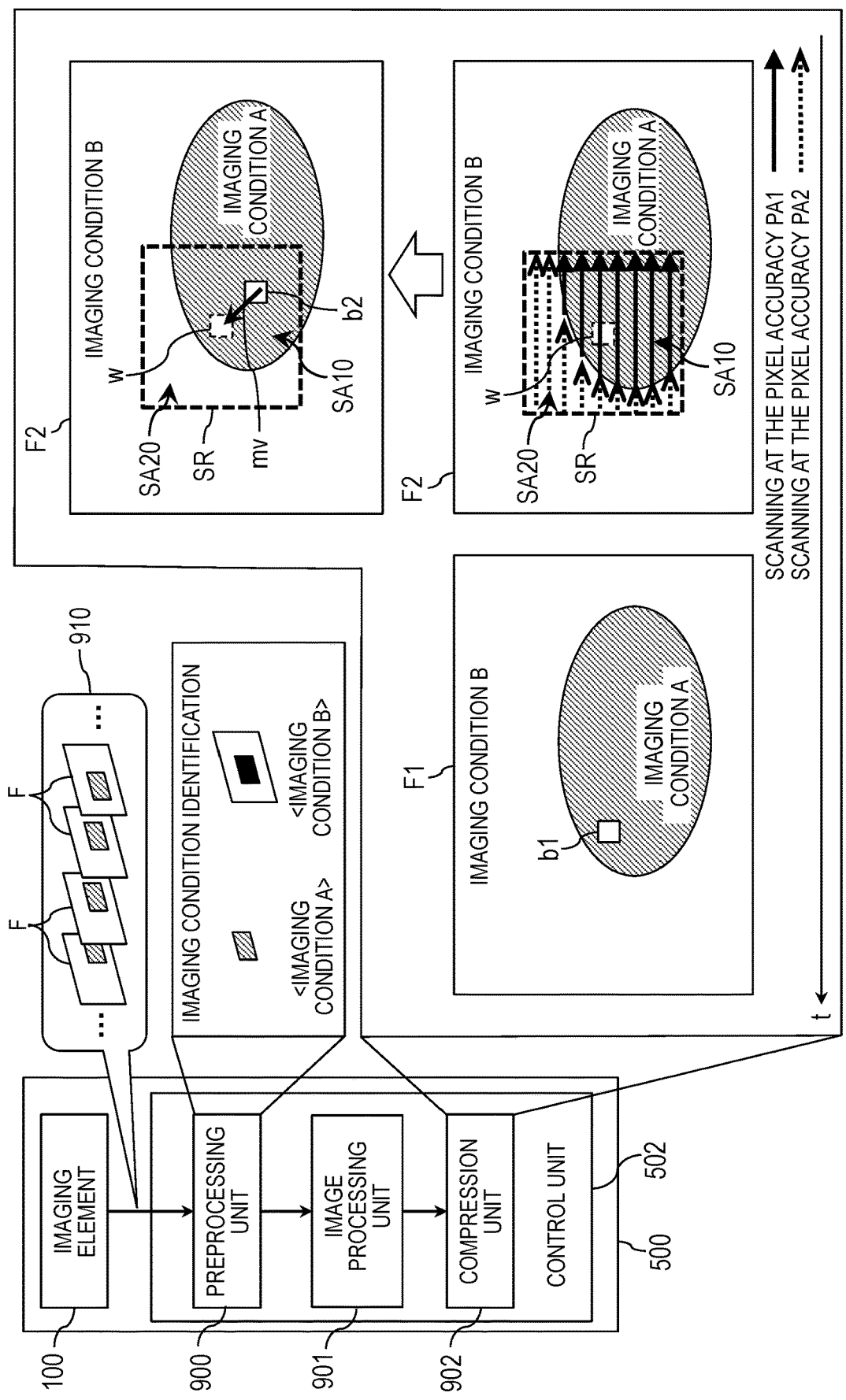
FIG. 23 illustrates the example of the block matching at different pixel accuracies.

FIG. 23 illustrates the example of the block matching at different pixel accuracies. The same parts as those of FIG. 9 are denoted with the same reference numerals and will not be described further. In FIG. 23, the pixel accuracy is used and the motion detection unit 1110 may include, within the search range SR, the search region SA of the imaging condition A (including the magnified/reduced one, hereinafter the first search region SA10). The first search region SA10 is subjected to the block matching at a certain pixel accuracy PA1 while the remaining image regions of the search range SR (hereinafter the second search region SA20) are subjected to the block matching at a pixel accuracy PA2 lower than a pixel accuracy PA1.

For example, the pixel accuracy PA1 at the first search region SA10 is a ½ pixel accuracy while the pixel accuracy PA2 at the second search region SA20 is an integer pixel accuracy. The combination of the pixel accuracies PA1 and PA2 is not limited to the above combination and may be any combination so long as the pixel accuracy PA1 is higher than the pixel accuracy PA2. For example, the pixel accuracy PA1 at the first search region SA10 may be a ¼ pixel accuracy and the pixel accuracy PA2 at the second search region SA20 may be a ½ pixel accuracy.

The motion detection unit 1110 may determine the first search region SA10 and the second search region SA20 based on the respective imaging conditions A and B (or a difference between the imaging conditions A and B), respectively. For example, the pixel accuracy may be a 1 pixel accuracy, a ½ pixel accuracy, or a ¼ pixel accuracy. When the imaging condition A has the exposure time of 1/30 [seconds] and the imaging condition B has the exposure time of 1/60 [seconds], a difference between the exposure times is small, thus causing a possibility where the main subject may exist in the image region of the imaging condition B.

Thus, when the difference between the imaging conditions A and B is equal to or lower than the threshold value T1, the region setting unit 1121 sets the pixel accuracy PA1 of the first search region SA10 to the ½ pixel accuracy and sets the pixel accuracy PA2 of the second search region SA20 to the 1 pixel accuracy. This can consequently suppress the decline of the block matching accuracy.

When the imaging condition A has the exposure time of 1/30 [seconds] and the imaging condition B has the exposure time of 1/1000 [seconds] for example, there is a large difference in the exposure time, thus causing a high possibility where the main subject image does not exist in the image region of the imaging condition B. Thus, when the difference between the imaging conditions A and B exceeds the threshold value T2 (T2≥T1), the region setting unit 1121 sets the pixel accuracy PA1 of the first search region SA to the ¼ pixel accuracy and sets the pixel accuracy PA2 of the second search accuracy to the 1 pixel accuracy. The region setting unit 1121 sets the pixel accuracy PA1 of the first search region SA10 to the ½ pixel accuracy and sets the pixel accuracy PA2 of the second search region SA20 to the 1 pixel accuracy. This can consequently achieve the reduction of the processing load of the block matching.

In this manner, the pixel accuracy of the second search region SA20 set to be lower than the pixel accuracy of the first search region SA10 can achieve, while the block matching of the second search region SA20 is allowed to be executed with a lower processing load than in the case of the first search region SA10, the suppression of the decline of the block matching accuracy when compared with a case where no block matching is executed on the second search region SA20.

<The Motion Vector Detection Processing Procedure at Different Pixel Accuracies>

Figure 24:
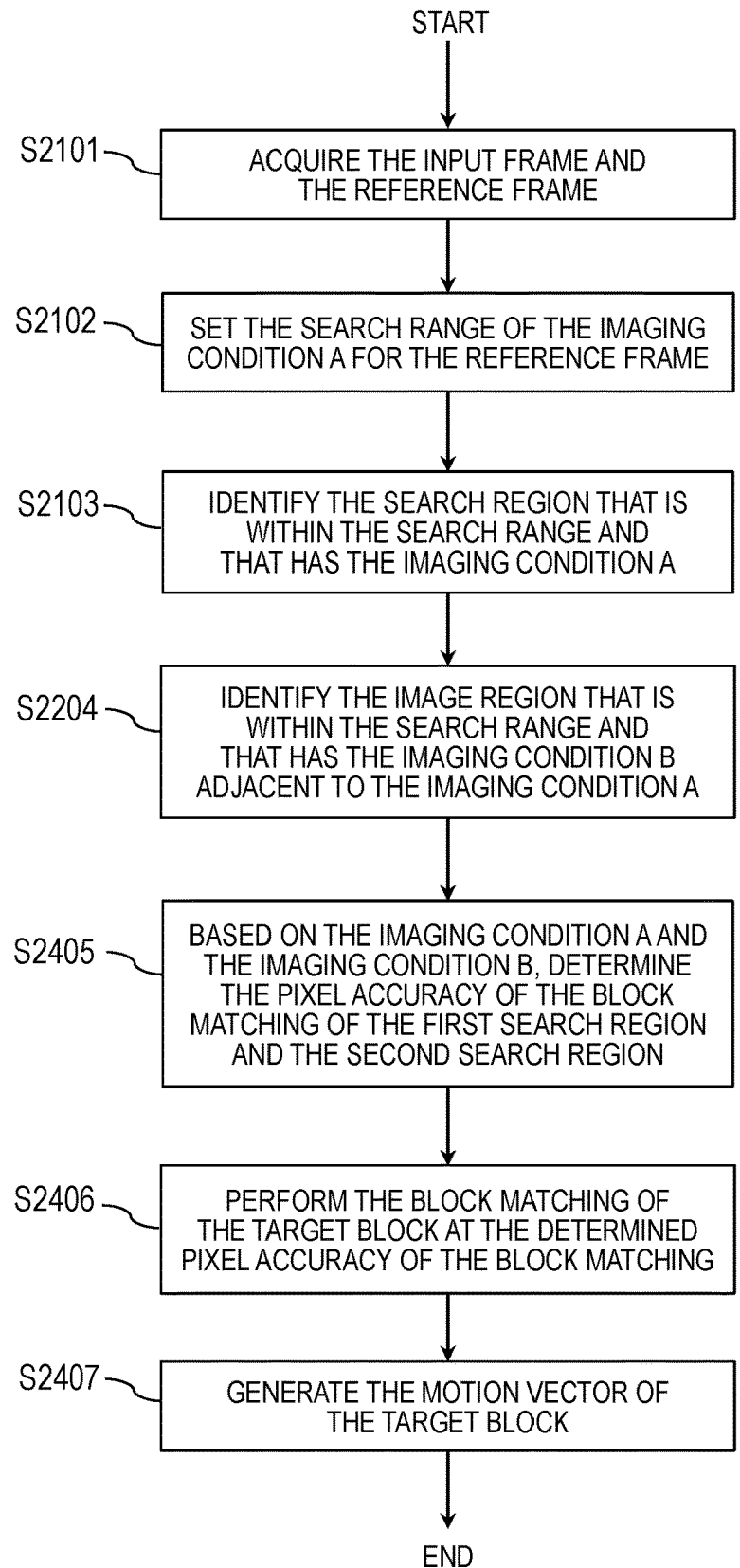
FIG. 24 is a flowchart illustrating an example of the motion vector detection processing procedure by the motion detection unit at different pixel accuracies.

FIG. 24 is a flowchart illustrating an example of the motion vector detection processing procedure by the motion detection unit 1110 at different pixel accuracies. It is noted that the pixel accuracies of the first search region SA10 and the second search region SA20 may be set by allowing a user to operate the operation unit 505 or may be automatically set by the electronic device 500 depending on the light reception amounts of the respective unit groups 202 in the imaging element 100. The same processing details as those of FIG. 21 and FIG. 22 are denoted with the same step numbers and will not be described further.

After Step S2204, the motion detection unit 1110 allows the region setting unit 1121 to determines, based on the imaging condition A and the imaging condition B, the respective pixel accuracies PA1 and PA2 for the block matching of the first search region SA10 and the second search region SA20 (Step S2405).

As in Steps S2104 and S2105, the motion detection unit 1110 allows the motion generation unit 1122 to scan the search window w in the first search region SA10 and the second search region SA20 after the determination of the pixel accuracies to thereby subject the target block b1 on the block matching (Step S2406) to generate the motion vector mv from the block b2 to the target block b1 (Step S2407).

This can consequently optimize, depending on the pixel accuracy of the search region SA, the suppression of the decline of the block matching accuracy and the reduction of the processing load of the block matching. Furthermore, even when the motion vector is detected at different pixel accuracies, as shown in the motion detection processing procedure example 2 of FIG. 22, the motion detection unit 1110 may allow the region setting unit 1121 to magnify the first search region SA10 (in this case, the second search region SA20 is reduced) or to reduce the first search region SA10 (in this case, the second search region SA20 is magnified).

This can consequently optimize, depending on the pixel accuracy and the magnification/reduction of the search region SA, the suppression of the decline of the block matching accuracy and the reduction of the processing load of the block matching in a more effective manner.

(1) As described above, the above-described video compression apparatus compresses video data as a series of frames outputted from the imaging element 100 that has a plurality of imaging regions for imaging a subject and for which imaging conditions can be set for the respective imaging regions. This video compression apparatus has the region setting unit 1121 and the motion generation unit 1122. The region setting unit 1121 sets, based on a plurality of imaging conditions, the search region SA in the reference frame used in a processing (e.g., the block matching) to detect a specific region (e.g., the block b2) from a reference frame (e.g., the frame F2) based on compression target region (e.g., the target block b1). The motion generation unit 1122 detects a specific region (e.g., the block b2) based on the processing using the search region SA set by the region setting unit 1121 (e.g., the block matching) to thereby generate the motion vector mv.

This can consequently set the range of the search region SA to a range considering a plurality of imaging conditions.

(2) Furthermore, in the above (1), the region setting unit 1121 may set the search region SA to a specific image region including the compression target region imaged based on a specific imaging condition (e.g., the imaging condition A) among image regions imaged respectively based on a plurality of imaging conditions.

This allows consequently to limit the search region SA by the specific imaging condition, thus allowing the specific region detection processing (e.g., the block matching) to have a reduced processing load.

(3) Furthermore, in the above (2), the region setting unit 1121 may set the search region SA to the specific image region and image regions of other imaging conditions surrounding the specific image region (e.g., the imaging condition B).

In this manner, by setting the search region SA to include the surroundings of the specific image region, the reduction of the motion vector detection accuracy can be suppressed, while allowing the motion vector detection to have a reduced processing load.

(4) Furthermore, in the above (2), the region setting unit 1121 may magnify or reduce the search region SA based on a plurality of imaging conditions.

This can consequently selectively achieve, depending on the magnification/reduction of the search region SA, the suppression of the decline of the accuracy of the specific region detection processing or the reduction of the processing load.

(5) Furthermore, in the above (4), the region setting unit 1121 may magnify or reduce the search region SA based on a difference in the values shown in a plurality of imaging conditions (e.g., a difference in the ISO sensibility).

(6) Furthermore, in the above 4, the region setting unit 1121 reduces the search region when the specific imaging condition (e.g., the imaging condition A) is a specific exposure time and other imaging conditions (e.g., the imaging condition B) other than a specific imaging condition among a plurality of imaging conditions is an exposure time shorter than a specific exposure time.

This can consequently achieve, even when the exposure time of the main subject is so-called long time-second, the reduction of the processing load of the specific region detection processing.

(7) Furthermore, in the above (1), the region setting unit 1121 sets, for the first search region SA10, a specific image region for which a specific imaging condition having the compression target region among image regions having a plurality of imaging conditions and sets, for the second search region SA20, other image regions other than the specific image region among the image regions. The motion generation unit 1122 may generate the motion vector mv by using the first search region SA10 set by the region setting unit 1121 and the second search region SA20 set by the region setting unit 1121 to execute the specific region detection processing having different pixel accuracies.

This can consequently execute the specific region detection processing at the pixel accuracy depending on the imaging condition.

(8) Furthermore, in the above (7), the motion generation unit 1122 may allow the specific region detection processing in the first search region SA10 to have the pixel accuracy higher than that of the specific region detection processing in the second search region SA20.

In this manner, the second search region SA20 having the pixel accuracy lower than the pixel accuracy of the first search region SA10 can provide, in the block matching of the second search region SA20, the suppression of the decline of the accuracy of the specific region detection processing when compared with a case where the second search region SA20 is not subjected to the specific region detection processing while achieving the reduction of the processing load more than in the case of the first search region SA10.

(9) Furthermore, in the above (2), the motion generation unit 1122 may execute the specific region detection processing at the exterior of the search region SA based on the result of the specific region detection processing in the search region SA. Specifically, when the block b2 matching the target block b1 is not detected in the search region SA, the motion generation unit 1122 executes the specific region detection processing on the remaining image regions that are within the search range SR and that exclude the search region SA (i.e., the image region of the imaging condition B), for example.

This can provide the search in the search region SA in a prioritized manner, thus providing the reduction of the processing load of the specific region detection processing and providing, even when the block b2 is not detected in the search region SA, the suppression of the decline of the accuracy of the specific region detection processing.

(10) Furthermore, in the above (2), the motion generation unit 1122 may execute the specific region detection processing for the search target range as a matching target with the compression target region in the search region SA (e.g., the search window w) based on the ratio between the specific pixels included in the search target range and the specific image region (e.g., the image region of the imaging condition A) and other pixels included in the image regions other than the search target range and the specific image region (e.g., the image region of the imaging condition B).

This can consequently adjust, at the boundary of the image regions of the different imaging conditions, the decline of the processing load and the suppression of the decline of the accuracy for the specific region detection processing.

(11) Furthermore, in the above (10), the motion generation unit 1122 may execute the specific region detection processing so that the search target range includes specific pixels only.

This can consequently pay a particular attention on the reduction of the processing load in the specific region detection processing at the boundary of the image regions of the different imaging conditions.

(12) Furthermore, in the above (10), the motion generation unit 1122 may execute the specific region detection processing so that the number of specific pixels within the search target range is higher than the number of other pixels.

This can consequently provide, at the boundary of the image regions of the different imaging conditions, the suppression of the decline of the accuracy in the specific region detection processing while prioritizing the reduction of the processing load.

(13) Furthermore, in the above (10), the motion generation unit 1122 may execute the specific region detection processing so that the search target range includes therein at least one specific pixel(s).

This can consequently provide, at the boundary of the image regions of the different imaging conditions, the suppression of the decline of the accuracy in the specific region detection processing while prioritizing the reduction of the processing load.

(14) Furthermore, in the above-described electronic device has the imaging element 100, the region setting unit 1121, and the motion generation unit 1122. The imaging element 100 has a plurality of imaging regions for imaging a subject and outputs video data for which imaging conditions can be set for the respective imaging regions and that are a series of frames. The region setting unit 1121 sets, based on a plurality of imaging conditions, the search region SA in the reference frame used in the processing (e.g., the block matching) to detect the specific region (e.g., the block b2) in the reference frame (e.g., the frame F2) based on the compression target region (e.g., the target block b1). The motion generation unit 1122 detects specific region (e.g., the block b2) based on the processing using the search region SA set by the region setting unit 1121 (e.g., the block matching) to thereby generate the motion vector mv.

This can consequently realize the electronic device 500 for which the range of the search region SA can be set to a range in consideration of a plurality of imaging conditions. It is noted that the above-described the electronic device 500 may be a digital camera, a digital video camera, a smart phone a tablet, a monitoring camera, a drive recorder, or a drone, for example.

(15) Furthermore, the above-described video compression program causes the processor 1001 to execute the compression of video data as a series of frames outputted from the imaging element 100 that has a plurality of imaging regions for imaging a subject and for which imaging conditions can be set for the respective imaging regions. This video compression program causes the processor 1001 to set, based on a plurality of imaging conditions, the search region SA within the reference frame used in the processing (e.g., the block matching) to detect based on the compression target region (e.g., the target block b1), the specific region (e.g., the block b2) in the reference frame (e.g., the frame F2). This video compression program causes the processor to generate the motion vector mv by detecting the specific region (e.g., the block b2) based on the processing (e.g., the block matching) using the set search region SA.

This allows the range of the search region SA to be set in consideration of a plurality of imaging conditions to be realized by software. It is noted that this video compression program may be recorded on a portable recording medium such as CD-ROM, DVD-ROM, flash memory, or the memory card 504. This video compression program may be recorded in a server capable of providing the downloading operation to the video compression apparatus or the electronic device 500.

What is claimed is:

1. A video compression apparatus for compressing video data as a series of frames outputted from an imaging element including an image sensor having a plurality of imaging regions for imaging a subject and for which imaging conditions can be set for respective imaging regions, comprising:
    a processor configured to
        set, based on at least one of the imaging conditions to which the imaging element is set, a search region within a reference frame used for a processing to detect, based on a compression target region, a specific region in the reference frame; and
        generate, based on the processing using the search region set by the processor, the specific region to thereby generate a motion vector.

2. The video compression apparatus according to claim 1, wherein the processor is configured to set the search region to a specific image region that is imaged based on a specific imaging condition including the compression target region, among image regions imaged based on the respective plurality of imaging, conditions.

3. The video compression apparatus according to claim 2, wherein the processor is configured to set the search region to the specific image region and image regions of other imaging conditions surrounding the specific image region.

4. The video compression apparatus according to claim 2, wherein the processor is configured to magnify or reduce the search region based on a relation among the plurality of imaging conditions.

5. The video compression apparatus according to claim 4, wherein the processor is configured to magnify or reduce the search region based on a difference among values shown by the plurality of imaging conditions.

6. The video compression apparatus according to claim 4, wherein the processor is configured to reduce the search region when the specific imaging condition is a specific exposure time and other imaging conditions among the plurality of imaging conditions other than the specific imaging condition is an exposure time shorter than the specific exposure time.

7. The video compression apparatus according to claim 1, wherein the processor is configured to set, as a first search region, a specific image region among image regions having a plurality of imaging conditions that has a specific imaging condition and in which the compression target region exists and set, as a second search region, image regions other than the specific image region among the image regions,
    wherein the processor is configured to use the first search region set by the processor and the second search region set by the processor to execute the processing having different pixel accuracies to thereby generate the motion vector.

8. The video compression apparatus according to claim 7, wherein the processor is configured to allow the processing in the first search region to have a pixel accuracy higher than that of the processing in the second search region.

9. The video compression apparatus according to claim 2, wherein the processor is configured to execute the processing exterior of the search region based on a result of the processing in the search region.

10. The video compression apparatus according to claim 2, wherein the processor is configured to execute a block matching for a search target range as a matching target with the compression target region in the search region based on a ratio between specific pixels included in the search target range and the specific image region and other pixels included in the image regions other than the search target range and the specific image region.

11. The video compression apparatus according to claim 10, wherein the processor is configured to execute the processing so that a search target range includes the specific pixels only.

12. The video compression apparatus according to claim 10, wherein the processor is configured to execute the processing so that a number of specific pixels within the search target range is higher than a number of the other pixels.

13. The video compression apparatus according to claim 10, wherein the processor is configured to execute the processing so that the search target range includes therein at least one specific pixel.

14. A video compression apparatus for compressing video data as a series of frames outputted from an imaging element including an image sensor and having a plurality of imaging regions for imaging a subject and for which imaging conditions can be set for respective imaging regions, comprising:
    a processor configured to
        set a search region for detecting a specific region within a reference frame based on at least one of the imaging conditions to which the imaging element is set; and
        detect, based on a compression target region having a frame different from the reference frame, the specific region from the search region set by the processor.

15. An electronic device, comprising:
    an imaging element including an image sensor and having a plurality of imaging regions for imaging a subject and that outputs video data for which imaging conditions can be set for respective imaging regions and that are a series of frames; and
    a processor configured to
        set, based on at least one of the imaging conditions to which the imaging element is set, a search region within a reference frame used for a processing to detect, based on a compression target region, a specific region in the reference frame; and detect, based on the processing using the search region set by the processor, the specific region to thereby generate a motion vector.

16. A non-transitory computer readable medium storing thereon a video compression program for causing a processor to execute a compression of video data as a series of frames outputted from an imaging element including an image sensor and having a plurality of imaging regions for imaging a subject and for which imaging conditions can be set for respective imaging regions, wherein the video compression program causes the processor:

to set, based on at least one of the imaging conditions to which the imaging element is set, a search region within a reference frame used for a processing to detect, based on a compression target region, a specific region in the reference frame; and to detect, based on the processing using the search region, the specific region to thereby generate a motion vector.

* * * * *